(12) United States Patent
Barinaga

(10) Patent No.: US 9,383,972 B2
(45) Date of Patent: Jul. 5, 2016

(54) METHODS AND ARRANGEMENTS FOR PROCESSING AND PRESENTATION OF INFORMATION

(71) Applicant: Juan Carlos Barinaga, Houston, TX (US)

(72) Inventor: Juan Carlos Barinaga, Houston, TX (US)

( * ) Notice: Subject to any disclaimer, the term of this patent is extended or adjusted under 35 U.S.C. 154(b) by 8 days.

(21) Appl. No.: 14/549,491

(22) Filed: Nov. 20, 2014

(65) Prior Publication Data

US 2015/0143329 A1 May 21, 2015

Related U.S. Application Data

(63) Continuation-in-part of application No. 14/082,172, filed on Nov. 17, 2013.

(60) Provisional application No. 61/906,882, filed on Nov. 20, 2013.

(51) Int. Cl.
*G06F 9/44* (2006.01)

(52) U.S. Cl.
CPC .............. *G06F 8/20* (2013.01); *G06F 9/4421* (2013.01)

(58) Field of Classification Search
CPC ........................................................ G06F 9/44
USPC .................................. 717/104, 105, 106–108
See application file for complete search history.

(56) References Cited

U.S. PATENT DOCUMENTS

| 7,607,099 | B2* | 10/2009 | Simonyi | G06F 8/10 709/246 |
| 7,962,891 | B2* | 6/2011 | Kimelman | G06K 9/6892 717/100 |
| 2002/0120920 | A1* | 8/2002 | Jayaram | G06F 17/50 717/137 |
| 2008/0092109 | A1 | 4/2008 | Kinnucan, Jr. et al. | |
| 2008/0295079 | A1* | 11/2008 | Yiftachel | G06F 11/3684 717/126 |
| 2012/0254842 | A1* | 10/2012 | Henderson | G06F 8/24 717/136 |
| 2013/0104105 | A1* | 4/2013 | Brown | G06F 11/3684 717/124 |

* cited by examiner

*Primary Examiner* — Chat Do
*Assistant Examiner* — Jae Jeon
(74) *Attorney, Agent, or Firm* — Schubert Law Group PLLC

(57) ABSTRACT

Embodiments may implement processing and presentation of information with, e.g., standalone and/or application integration, object-oriented, hierarchical architecture, in the form of, e.g., an add-in application or a computing platform for creating, modifying, interpreting, compiling, and/or executing an application. Embodiments may be implemented as a discrete computing platform or as an overlay, allowing interoperability with capabilities of the overlaid platform. Many embodiments correspond to computing platforms that support a new computing paradigm, a definition-centered paradigm. The definition-centered paradigm is an object-oriented hierarchy referred to as a Model hierarchy with one or more data structures referred to as Entities and, in many embodiments, interface types referred to as Relations. Each Entity has a defined type that specifies the data structure layout and supported functions. Each data structure type may implement a set of Relations, forming part of a type hierarchy that affects the resolution of the Model.

12 Claims, 14 Drawing Sheets

METHODS AND ARRANGEMENTS FOR PROCESSING AND PRESENTATION OF INFORMATION

BACKGROUND

Embodiments are in the field of computer processing. More particularly, embodiments are in the field of processing and presentation of information with, e.g., standalone and/or application integration, object-oriented, hierarchical architecture, in the form of, e.g., an add-in application or a computing platform for creating, editing, interpreting, compiling, and/or executing an application.

Computing platforms form the basis by which higher level computing processes are defined and executed. Evolving computing paradigms have necessitated the corresponding evolution of computing platforms which support those paradigms, such as the imperative, object oriented, and functional paradigms.

DETAILED DESCRIPTION OF EMBODIMENTS

Figure 1:
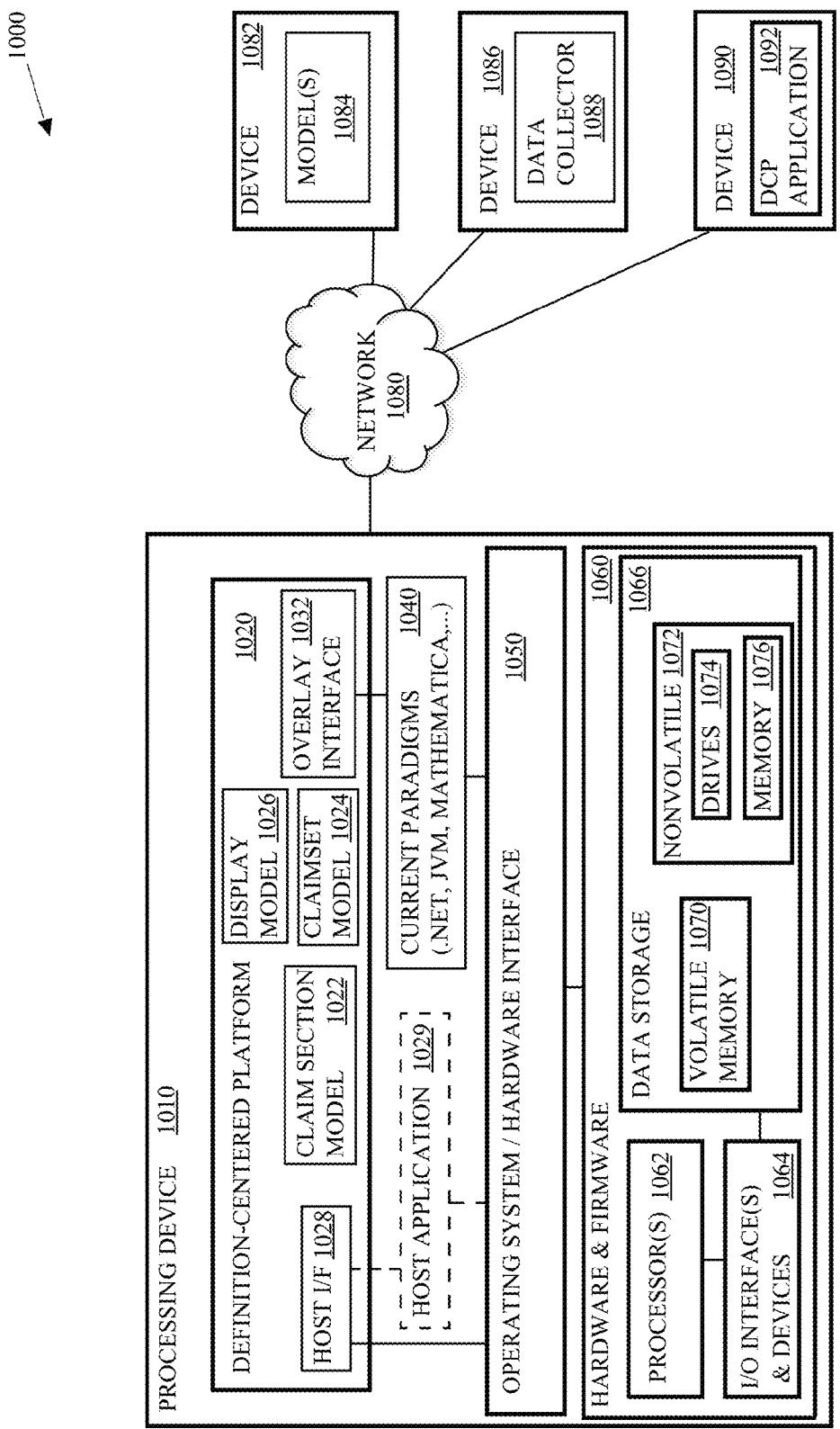
FIG. 1 depicts an embodiment of a system comprising a plurality of devices for processing and presentation of information.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may implement processing and presentation of information with, e.g., standalone and/or application integration, object-oriented, hierarchical architecture, in the form of, e.g., an add-in application or a computing platform for creating, modifying, interpreting, and/or executing an application. Embodiments may be implemented as a discrete computing platform, overlay of a host platform such as Microsoft's .NET framework or Oracle's Java Runtime Environment also referred to as Java Virtual Machine (JVM), or as an add-in to a host application, such as Microsoft Excel™, allowing interoperability with capabilities of the host.

In some embodiments, the add-in application or computing platform may comprise a web site or part of a web site. In other embodiments, the add-in application or computing platform may comprise part of a spreadsheet program, part of a word processing program, or a standalone program that can be integrated with another application.

Many embodiments correspond to computing platforms that support a new computing paradigm, referred to herein as a definition-centered paradigm (DCP). A definition-centered paradigm can provide the basis for computing assemblies that are simpler and more powerful than those of current paradigms alone. The definition-centered paradigm enables an object-oriented hierarchy referred to as a Model hierarchy that includes one or more data structures referred to as Entities and, in many embodiments, additional data structure types referred to as Relations. Each data structure within the platform, including Entity and Relation instances has a defined Kind. A Kind has operability of the Type in contemporary object oriented languages but also includes additional capabilities. A Kind specifies the data structure layout and supported functions such as Character functions, String functions, Value functions, Number functions, Date functions, Error-Handling functions, and the like. Each Entity Kind may be realized within a set of Relation Kind and may be part of a Kind hierarchy that affects the resolution of Entities and, thus, the resolution of the Model. The base features of Type are enabled by Kind. Moreover, each Type instance of an underlying platform (e.g. .NET, JVM) may have a one to one correspondence with a Kind instance established by the DCP platform. While the term Kind is used herein to distinguish embodiments from contemporary paradigms, the terms Type and Kind may be used interchangeably.

In some embodiments, Models may comprise a single Entity without a corresponding Relation. In many embodiments, Models may comprise Entities and one or more Relations. In several embodiments, Models may be composed of alternating layers of Entity and Relation objects. Each Entity or Relation that exists within a hierarchy of a Model is referred to as a Constituent. For example, the top Constituent of a hierarchy of a Model could be a Matrix (a type of Entity). The Matrix may comprise a child relation that is referred to as a Segment. The Segment may relate the Entity to another Entity, which would be a child Entity in this Matrix. Another type of Entity may comprise, for example, a Symbol, an Expression, a Kind, a Body, or a Basis.

Embodiments of a Model may comprise Constituents. Each Constituent has a definition that is based upon the type of the Constituent such as an Entity or a Relation, and performs a function within the Model hierarchy based upon the definition of the Constituent in a manner that is consistent with other Constituents within the Model hierarchy. Furthermore, in many embodiments, each Constituent is addressable. For example, a Constituent may be a child of a parent Entity related by a parent Relation and the Constituent may be addressable relative to the parent Entity and parent Relation. The Constituent may also inherit or may be encapsulated by the parent Entity based upon the type of the parent Relation. In some embodiments, the Constituent may perform a function such as contain an Edifice, Expression, Routine, Symbol, or Kind to be resolved. The Constituent may be resolvable via the definition of the Constituent in the Model hierarchy and the results identified by the Constituent for resolution of the Model may be within the context of the parent Relation and the parent Entity.

Definitions of Constituents may be accessible as an Expression and/or other data structure. For example, an Entity such as a matrix object could be defined with NewMatrix(Volume{ }*Price{ }). A Relation's definition relates to a corresponding Entity, while an Entity's definition may be independent. In many embodiments, the definition may enable a Constituent to be reproduced in other contexts, and may allow its precedent/dependent Relationships to be detected by the DCP platform. The definition may also allow Constituents to be dynamic, both in content and in execution. The arguments within the definition of an Entity may be set using Expressions that become the definitions of descendant Entities. For instance, a Constituent with a dynamic content may be a Constituent that has, e.g., an Expression that contains a value or sub-Expression that differs depending upon resolutions of one or more other Constituents or that contains a function that differs depending upon resolutions of one or more other Constituents. For instance, a first Constituent may have dynamic content that identifies a second Constituent as part of an Expression such as A+B*Expression(second Constituent). The resolution of the second Constituent may result in X^2 or SQRT(X) depending on the context. Thus, the dynamic content would include the expression A+B*X^2 or A+B*SQRT(X) depending upon the context in which the second Constituent is evaluated at runtime.

Several embodiments include one or more Relations to relate an Entity to specific properties or generally to all properties of another Entity and/or to relate an Entity to a parent or descendant Entity. In some embodiments, types of Relations may comprise FulfillmentRelations, Segments, SupplementRelations, Transients, Fragments, and/or other types of Relations.

Resolution of a Model may involve evaluating or updating Constituents of the Model based upon the current context or the current state of the system. The current context of the system may affect the evaluation of Expressions of one or more Constituents within a Model. As a simple example, the context or state of the system may comprise the values of one or more cells in a spreadsheet. In some of these embodiments, the values of at least some of the Constituents of the Model may be evaluated or updated based upon the current values in the one or more cells in the spreadsheet. A model initiator may input the current values of the one or more cells into a Model to create a realized Model to pass to a resolution module for resolution of the Model and the Expressions of each Constituent of the Model may be updated or evaluated based upon those current values in the resolution module. Note that a very simple Model may not require insertion of current context for resolution to a realized Model.

In more elaborate systems, the current context of the system for a Model may comprise current values or Expressions from one or more sources such as other Models, data structures, or data sources. For example, a Model may evaluate the health of an Enterprise system, receiving or retrieving values from data structures at multiple, local area network administration servers and resolving the Expressions of Constituents of the Model that are reliant on the values received from the multiple, local area network administration servers.

In many embodiments, Models and resolution of Models can be dependent on current systems or contexts. For instance, the Model to evaluate the health of an Enterprise system may comprise one or more Entities that are defined as arrays. Such arrays may be expandable and may handle systems of, e.g., two local area networks to systems with hundreds of local area networks. Evaluation of the Model of the health of the Enterprise systems may not only generate results with one or more arrays characterizing the health of each of the local area networks based upon different factors but may also generate more generalized characteristics of the health of the Enterprise system based upon different factors of the health of the local area networks. In such a Model, the input from the Enterprise system may comprise one or more arrays of values descriptive of the current context of the local area networks and the Model may define a report that presents results in one or more different formats that may vary based upon the size of the arrays received as input for the system.

Several embodiments can also execute code from current paradigms by integrating functionality of the current paradigms within the Model hierarchy. For example, some embodiments include a current paradigm interface module or overlay interface to facilitate the integration of functions from current paradigms or an operating system into a Model created in the definition-centered paradigm. In such embodiments, the Kinds are Entities that can map functionality and interface with Types of an overlaid application. In several of these embodiments, resolution of the Model involves calls to the overlaid application and/or a host operating system to perform operations within the overlaid application and to return results of the operations to the Model. The results may then be accessible via the Model hierarchy for resolution of the Model.

In many embodiments, the hierarchy of a Model may be implicit or explicit. In some embodiments, the Kinds for Entities may specify constraints regarding the creation and realization of instances of Entities within a Model. In several embodiments, the Model may comprise a number of explicit Relations to indicate parent-child relationships and/or definitions of relationships between Entities. The parent-child relationship may define the types or properties of descendant Entities based upon the types and/or properties of the parent Entities. The definitions of the Relations may define the perception of the resolution of the child Entities by the corresponding parent Entity. In some embodiments, the explicit hierarchy of Constituents may define the hierarchy for the purpose of resolution of the Model.

The Resolution of a Model enables Entities to execute their definitions, but does not enable the Model's definition to be modified. A Resolution can be automatically followed by an Effectuation, which is a method that can modify a Model's definition within given constraints.

In further embodiments, the hierarchy of the Constituents for the purpose of resolving the Model may be based upon the "tokens" in the definitions of the Constituents. Definitions of the Constituents may include, e.g., arrays and Expressions and the "tokens" may be variables that rely on the resolution of other Entities within the Model and/or the resolution of Relations that define the perception of an Entity by a parent Entity. Thus, the order in which the tokens can be resolved may define the implicit hierarchy of the Constituents for the purposes of resolving the Model.

A Relation can define the perception of an Entity by, e.g., filtering the results of the resolution of an Entity by, e.g., an Expression. For example, a Parent Entity may be defined as an Expression of 5*{Child Entity}, wherein {Child Entity} is a token that references an address of the Child Entity to indicate that a result of the resolution or evaluation of the Child Entity is multiplied by 5 to determine the resolution of the Parent Entity. The Child Entity of this Parent Entity may be defined in xyz coordinates of a Cartesian coordinate system as (5*X, Y/5, Z+3/5). And a Relation associating the Parent Entity with the Child Entity may be defined by the Expression of ({Child Entity}, null, null) to indicate that the Parent Entity Expression is resolvable with the x coordinate resulting from the resolution of the Child Entity. As a result, if the value of X is defined as resolvable to a value then the resolution module may determine that the Child Entity will be resolved prior to resolving the Parent Entity. On the other hand, if the variable X is defined as a variable such that the resolution of the Parent Entity is an Expression, then the Parent Entity may be resolved first to determine the result of 5*5*X, which equals 25*X.

Furthermore, many embodiments are not limited to resolutions of Constituents that produce values. Several embodiments comprise Entities defined to produce an Expression or array comprising one or more Expressions as a result of resolution of the Entity. For example, an Entity may be defined with an Expression of aX+bY. Upon resolution of the Entity, the values of a and b may be determined but the values of X and Y may remain as Symbols to produce a result of, e.g., "3X+8Y". As a further illustration, if the Relation between the Parent Entity and the Child Entity above is instead defined as simply a parent-child relationship without an Expression, the default resolution of the Expression of 5*{Child Entity} may be (5*(5*X), 5*(Y/5), 5*(Z+3/5)), which equals (25*X, Y, 5*Z+3).

Note that the rules about how a constituent is resolved do not pertain to its value, but to the automation of those resolutions and whether or not it enables or includes effectuation. Note that default rules for resolution of Constituents may be defined generally for all Models, specifically for one or more Models, generally for types of Constituents, and/or specifically for a type of Constituent. In many embodiments, multiple default rules for resolution may be associated with a Constituent. In such embodiments, an order of priority may be assigned to each level of rules. For instance, in one embodiment, the more generally defined rules for Models and Constituents apply to the extent that they do not conflict with the default rules assigned specifically to a Model or a Constituent. In several embodiments, default rules of resolution may be overridden by a conflicting rule associated with a realized Constituent defined as a characteristic or property of the Constituent. For instance, a realized Entity that may be associated with a general resolution rule may be flagged as unresolvable if the resolution requires a division by zero. In some embodiments, the flag may be immediately passed to an error handling report to communicate the flag to a user and, in other embodiments, the flag may be passed to the user via a deferred method. However, the Entity in the Model may have a maximum value of 10 so the Entity may be assigned a property that defines a rule of resolution for the Entity that requires a division by zero during a resolution to be defined as a resolution having a resulting value of 10.

Some embodiments comprise a computation platform. Embodiments comprising computational platforms may provide the support and tools for creating, storing, resolving code, and exploring results of the resolution for a definition-centered paradigm. Embodiments of computational platforms may comprise an apparatus to open Sessions of a Definition-Centered Paradigm (DCP) platform. The Session may be an environment for opening, creating, editing, resolving, and/or exploring results of a Model that includes, e.g., access to tools for creating and editing Models such as a Library of Models and Constituents of Models, default rules for resolution of Models and/or Constituents, and default reports for Models. In such embodiments, the default reports may define how a user may explore the results of resolutions of the Models in, e.g., a debugging mode and/or a standalone execution mode. In many embodiments, each Session may allow creation or editing of a single Model. In some embodiments, more than one Model may be opened concurrently within a Session to allow the creating, editing, debugging, and/or executing more than one Model. In some embodiments, more than one Session may be opened simultaneously, each with its own settings. In some embodiments, a call to retrieve a value from another Model may involve resolution of more than one Model concurrently.

In several embodiments, the DCP platform may be a standalone application comprising a DCP Model editor to open Sessions to edit Models, a DCP Library for definitions of Constituents and definitions of reports to present results, a Host Interface to open or save a Model and to establish a user-interface via an operating system, a DCP resolution module, and a DCP results presenter to present the results to a user via, e.g., a display, printer, and/or other form of output. Several embodiments may also comprise an overlay interface module to interface current paradigms.

In other embodiments, the DCP platform may be an add-in or embedded application comprising a DCP Model editor to edit Models, a DCP Library for definitions of Constituents and definitions of reports to present results, a Host Interface to interact with a host software application such as a spreadsheet or word processing program and possibly to support a user-interface via an operating system, a DCP resolution module, and a DCP results presenter to present the results to a user via the host software application and/or via the operating system.

For example, a user may execute a DCP platform as a standalone application or an add-in application overlaying an operating system and one or more current paradigms. The user may open a Session and the Session may comprise a Model for Entities that can be saved or embedded. The Model may comprise a Model hierarchy comprising an Edifice (Entity of arrays), an Expression (Entity of evaluable Expressions), a Kind (Entity of designing types), as well as one or more Segments to define relations with cells of the Edifice and other Entities and a Facet to define relations with fulfillments of an Entity property. The Facet may, for instance, have properties including a name identifier and resolve type. Each resolve type may identify an Expression for a Facet's fulfillment, or resolution.

Many embodiments comprise computer systems or computer networks. Several embodiments comprise client devices such as routers, switches, servers, workstations, netbooks, mobile devices (Laptop, Smart Phone, Tablet, and the like), as well as sensors, meters, controls, instruments, monitors, appliances, and the like. The computer systems such as servers, workstations, netbooks, and mobile devices may comprise a Host System with hardware and firmware as well as software. The software may comprise one or more operating systems that execute on the hardware and firmware and possibly one or more applications that execute on one or more of the operating systems.

Some embodiments are standalone applications or embedded applications and may comprise one or more Models. The application may comprise a Model with at least one Entity and possibly multiple Entities interrelated with one or more Relations that are resolvable to generate results. In many embodiments, the application may also comprise one or more reports to facilitate the exploration of the results via a user interface.

A Model may comprise code representing a Model hierarchy of Entities (data structures and data structure types) and Relations (interface types) that can be executed to perform functionality of the Model such as to resolve the Entities to produce or update results or the Entities. In many embodiments, the code of the Model may be saved or embedded. For instance, a Model may be saved as a model file in data storage or saved as code embedded in another type of file like code in one or more cells of an Excel Worksheet or Workbook or code in a word processing program.

In some embodiments, the DCP platform may direct resolution of the Model via the real time scheduling, compilation, interpretation, and execution of Constituents. In many embodiments, the DCP platform may comprise error detection, resolution, and/or reporting functionality. In some embodiments, a DCP resolution module may detect an unresolvable element of an Entity such as a circular definition of an argument, token, or variable of an Expression or an array. The DCP resolution module may determine that the Entity comprises an error resolution property such as an Expression to resolve errors generally, resolve particular types of errors, and/or error messages to provide to a user. The error resolution property may be part of the Entity definition, may be part of a parent Relation definition, and/or may be part of a parent Entity definition. For instance, a supported function of an Entity may involve error resolution to resolve conflicts in case an error otherwise prevents resolution of the Entity or a descendant Entity. In some embodiments, the definition of a parent Relation may indicate a result to return to a parent Entity in response to an error in the resolution of a child Entity.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may implement wireless communications. Some embodiments may comprise wired communications such as local area networks (LANs), personal area networks (PANs), metropolitan area networks (MANs), wide area networks (WANs), and some embodiments may comprise wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a system 1000 for processing and presentation of information. The system 1000 comprises a processing device 1010 that may be wire line and wirelessly connected to a network 1080. The processing device 1010 may communicate wirelessly with a plurality of communication devices 1082, 1086, and 1090 via the network 1080. The processing device 1010 may comprise a definition-centered platform (DCP) 1020 for creating, modifying, interpreting, executing, and/or exploring the results of an application with an object-oriented, hierarchical architecture. The DCP 1010 may facilitate the creation and use of software in the form based on a definition-centered paradigm that implements a Model hierarchy. The Model hierarchy may comprise one or more data structures referred to as Entities and, in many embodiments, interface types referred to as Relations. For example, a user may determine to create code for an object-oriented structure that allows the numbering and renumbering of patent claims during the patent application drafting process. Patent claims include one or more sets of independent claims and each set of independent claims typically comprises one or more dependent claims. The dependent claims within each independent claim may reference a precedent claim within the independent claim set and as claims are added to the independent claim set, the numbers of the claims and the numbers of the claim references must be updated. Furthermore, as independent claim sets are added, the number of the claims including the independent claim as well as the numbers of the claim references must be updated.

The user may generate the coding for claim numbering in a number of different ways depending on how the software might be used or might be integrated with other software. In some embodiments, the user may generate a new Model or modify an existing Model to create a Claims Section Model 1022 as an object associated with the claims section of a patent application, a Claimset Model 1024 as an object associated with each set of claims, and a Display Model 1026 to provide an interface to generate a graphical user interface to display tools and options. For instance, the DCP 1020 may access a library of Models locally stored and/or a library of Models 1084 available from the device 1082 via the network 1080. In such an embodiment, the Claims Section Model 1022 may implement rules for drafting each of the independent claim sets in the instance(s) of the Claimset Model 1024. Facets or Fragments may relate the instances of the Claimset Model 1024 to the top of the Claim Section Model 1022 to maintain a record of the addresses for each of the instances of the Claimset Model 1024. Parent-child Relations may relate each of the Entities for independent claims to Entities for the dependent claims. In other embodiments, the Claims Section Model 1022, the Claimset Model 1024, and/or the Display Model 1026 may comprise Entities within the same Model.

In some embodiments, instances of each of the Models 1022, 1024, and 1026 may be inserted into a document strictly to automatically number and update the numbering of independent and dependent claims in the claims section of a patent application. In further embodiments, the Models 1022, 1024, and 1026 may define the claims in the claims section and include assistance in drafting such as standard and custom preambles, independent claim formats, dependent claim formats, text for claims to relate dependent claims to specific limitations in the corresponding independent claims, and the like. For example, after inserting an instance of a Claims Section Model 1022 into a word processing document, the Claims Section Model 1022 may establish a tool bar and one or more preference windows via one or more Kinds that map functionality to customize the tool bar to functionality in the Claims Section Model 1022.

In one embodiment, the Claims Section Model 1022 may establish the tool bar with a tool button that can be clicked via a mouse and/or selected via keystrokes to insert an independent claim by inserting an instance of a Claimset Model 1024. In several embodiments, an independent claim preference panel may be available while drafting an independent claim including an ability to select a property of a claim type such as a method, a process, an apparatus, a system, a medium, a product-by-process, and/or other claim types. An Entity in the Claims Section Model 1022 may have an Expression for the claim type and a first Fulfillment Relation may relate the Entity to a child Entity that comprises a Series. The first Fulfillment Relation may comprise a token that can be resolved by user input. And the Series may comprise a list of claim types from which the user may choose a claim type for the independent claim. A second Fulfillment Relation may relate the Entity to a standard preamble and a token in an Expression of the second Fulfillment Relation for selecting from a second Series of standard preambles based upon the user selection of the claim type. A third Fulfillment Relation may relate a third Series as a child of the Entity and the third Fulfillment Relation may include a token for selecting between a list of custom preambles in the third Series based upon the user input about the claim type. Then the Entity may comprise an Expression with a token for selecting the claim type from the first Fulfillment Relation and for selecting between the preambles from the second Fulfillment Relation and the third Fulfillment Relation based upon user input in the independent claim preference panel.

A Series may be an Entity that comprises a series of values from which to select. In some embodiments, the series of values may comprise a list of phrases such as a list of preambles or a list of claims. In further embodiments, the Series may comprise a list of numbers, characters, alphanumeric strings, words, sentences, paragraphs, and/or the like.

A Fulfillment Relation may be a type of Relation whose instances are Relations for a given Facet of an Entity kind's definition. Each Facet specifies a type and default Expression for instances of the Entity. A given Fulfillment Relation instance corresponds to a Facet of the Kind of the Fulfillment Relation's source (its parent Entity). Furthermore, a Facet may include additional features. For example, a Facet may require that its fulfillment be restricted by specifying an Expression that creates a child Entity that is a child of an Entity's instance. For example, a part of the resolution of the Claims Section Model 1022 may be defined to resolve claim numbering for independent claims. After an instance of the Claims Section Model 1022 may be inserted at the top of a claims section in a patent application or in a separate text document, the Claims Section Model 1022 may comprise a Model Initiator associated with rules of resolution to determine the context of the claims section from the document. In some embodiments, the rules may indicate that the insertion of the Claims Section Model 1022 is the top of the claims section regardless of the location within the document. In further embodiments, the rules may indicate that the instance of the Claims Section Model 1022 should determine the start location within a page in the document of the claims section of the patent application based upon the location of the claim that is closest to the top of the document. And the Claims Section Model 1022 may count claims in the document.

In some embodiments, the insertion of an independent claim in the document may involve the insertion of an instance of a Claimset Model 1024. Each instance of the Claimset Model 1024 in the document may, in several embodiments, represent an independent claim set with one independent claim and all the claims dependent upon the one independent claim. In most embodiments, the DCP 1020 may catalog and track the existence and removal of Model instances in documents. The DCP 1020 may then maintain an Array of the instances so that the instances are addressable and accessible by the DCP 1020 and other Model instances inside the document and, in many embodiments, in other documents. For example, a DCP application 1092 executing on a Device 1090 may comprise one or more Entities with Expressions that are resolved by accessing data in the Claims Section Model 1022 of the processing device 1010. In several embodiments, a table or list summarizing the Model instances included in the document resides within the document and can be found by the DCP 1020 upon opening the document. The table or list summarizing the Model instances may be an Entity of, e.g., the Claims Section Model 1022, wherein the elements in the table or list are Expressions that can be resolved to summarize the Model instances included in the document.

In some embodiments, the Model instances within a document may reside together at a single location within the document such as at or near the top of the document such that the DCP 1020 can locate the single location to gain access to the data stored in the Model instances. In such embodiments, the Model instances may output results to specified or identified locations within the document. For example, the Model instances may reside near the top of a word processing document and the Model instances may include special characters, numbers, and/or symbols, referred to as tags or flags, at locations in the document at which the Model instance is to display a particular output like a claim number. In one embodiment, the tags typically do not print and are not visible to the user but create a window and the composition of the tags may be dependent upon the particular host program 1029 in which the tags are being used. The Model instances may then insert a result of the resolution of the Model instance between the tags to display the result in the document.

In other embodiments, Model instances may be stored at various locations throughout the document and the DCP 1020 may store a table Model in the document that maintains, e.g., a unique identification of the Model instance as well as an actual location, logical location, or relative location of the Model instances in the document. For instance, the actual location may be a character count, line count, page count, at a unique tag, and/or other location identifying information for each of the Model instances. The logical location may be a location identifier that can be mapped to an actual location via a page translation table that resides in the document. The relative location may be a location that is relative to the table, a tag, or some other identifiable location in the document. In several embodiments, the table may also include values associated with the Model instances such as resolved values of claim counts.

In further embodiments, the DCP 1020 may encounter a document with Model instances that were not created by DCP 1020, for which the DCP 1020 does not have a list, or for which the document does not have a table to identify the Model instances. In such embodiments, the DCP 1020 may comprise capabilities to identify Model instances in the document and their locations (actual, logical, and/or relative). For instance, the instance of the DCP 1020 may access resources of the underlying host application 1029 such as the word processing program, a database, or the text editor via a host interface 1028 to determine the relative locations of the Model instances within the document. In further embodiments, the instance of the DCP 1020 may access resources of the underlying host application 1029 via the current paradigms 1040 or via to the operating system 1050. For instance, the word processing program may perform a search of the document to determine the location of tags that indicate the presence of the instances of one or more Models. In some embodiments, the DCP 1020 may verify that the tag is actually associated with a valid Model prior to logging the presence of the Model. For instance, what appears to be a tag may be a random occurrence in the document based upon another, unknown add-in program so the DCP 1020 may verify other attributes of a Model after identifying what appears to be a tag in the document.

A Model instance search may be implemented by an Entity with an Expression that implements one or more Entities referred to as Kinds. A Kind is a type of Entity used to create a declarable reference to an object type. The Kind may map functionality of the DCP 1020 to functions of the word processing program or text editor (host application 1029) to perform the search for and catalog the number of Model instances within the document.

After inserting the instance of the Claims Section Model 1022, the instance of the Claims Section Model 1022 may be resolved by a resolution module of the DCP 1020. The Claims Section Model 1022 may comprise a total claim count and a count of the number of independent claims in the document and each of the instances of Claimset Model 1024 in the document may comprise an Expression of a Claim Count in an Entity that tracks the number of claims associated with that particular instance of the Claimset Model 1024. Thus, the Claims Section Model 1022 can determine the total claims count in the document by an Expression that sums the claim count value resolved in each of the instances of the Claimset Model 1024 in the document. The Claims Section Model 1022 can determine the total number of independent claims in the document by an Expression that counts the number of Claimset Model 1024 instances in the document. Note that upon identifying the instances of the Claimset Model 1024, each Claimset Model 1024 instance and the Entities within the Claimset Model 1024 instances are individually addressable. In other words, the DCP 1020 maintains a unique address for each Model instance in the document so that each Model instance can access the information stored in the other Model instances by use of tokens in Expressions of the Model.

After insertion of a Claimset Model 1024 in the document, the Claimset Model 1024 may receive or retrieve the claims count from the Claims Section Model 1022 to determine the value for the claim number property at the top of the Claimset Model 1024. In some embodiments, the Claims Section Model 1022 may also include a designation for an order of each of the instances of the Claimset Model 1024 in a table along with an address for each of the instances of the Claimset Model 1024. The table may be an Entity with a table of Expressions that are resolved to determine the addresses, the designations for the order of the instances of the Claimset Model 1024, total and independent claim counts, claim types, and possibly other values. The designation for the order may be a number and the number can facilitate a determination of claim number for each of the claims in the document by determining the number of claims prior to a claim in the document. For example, an Entity in the Claimset Model 1024 that determines the claim number may comprise tokens to determine the claim counts of each of the instances of the Claimset Models 1024 that have an order designation that precedes the order number of the Entity. In many embodiments, the claim number associated with the first claim associated with a Claimset Model 1024 may then be one plus the total count of claims in each of the instances of the Claimset Model 1024 that have an order designation that precedes the order number of the Entity. Thus, the Entity may define an Expression as one plus the number of precedent claims or zero if there are no precedent instances of the Claimset Model 1024.

The Display Model 1026 may comprise a Model with one or more Kinds to facilitate interfacing a word processing program such as Microsoft® Word as an add-in. In several embodiments, the Display Model 1026 may comprise Kinds to facilitate interfacing with multiple different word processing programs and may also include interfacing with a Text Editor via the host operating system 1050 such as MAC OS®, Microsoft® Windows, Unix®, Linux®, or the like.

In some embodiments, the Display Model 1026 may comprise one or more Kinds that comprise Expressions to act as an Overlay interface 1032. The Overlay interface 1032 may interface with current paradigms 1040 such as .NET, XML, XSL, SOAP, UDDI, JVM, VC++, VB, ODBC, MFC, COM, ASP, SAP, Siebel, Microsoft® Exchange, Mathematica, or the like. For example, an instance of the Display Model 1026 may comprise an Entity with Expressions to display the results of resolving the claim numbering by the instances of the Claim Section Model 1022 and the Claimset Model 1024. In one embodiment, the Entity may display via the JVM a window with the total claims count value, the independent claims count, the total number of pages in the application, the total number of words in the abstract of the application, and the like.

In some embodiments, the user may instruct the DCP 1020 to compile the Claims Section Model 1022, Claimset Model 1024, and the Display Model 1026 as an add-in application for a word processing program. In other embodiments, the user may instruct the DCP 1020 to compile the Claims Section Model 1022, Claimset Model 1024, and the Display Model 1026 as a standalone application that can execute on one or more different operating systems 1050. In such embodiments, the standalone application may interface the operating system 1050 via a host interface 1028 to generate results as, e.g., a text file via a text editor or a database for, e.g., Oracle, SQL Server, Sybase, or Microsoft® Access. The application, whether standalone or an add-in, may comprise a results presenter to generate output text of the claims without the special characters or tags but with values inserted as the claim numbers after the user is done editing the claims to prepare the patent application for filing. In still other embodiments, the tags and instances of the Models remain in the text so with an indication that the application has been filed so that the claim number can be fixed as of the date of the filing but the tools remain for adding more claims or editing the claims as filed.

The processing device 1010 may comprise a consumer electronics device, a personal mobile device, a computer, a laptop, a netbook, a cellular phone, a smart phone, a PDA (Personal Digital Assistant), or other device capable of executing code such as the DCP 1020. In the present embodiment, the processing device 1010 comprises an operating system 1050 that can act as a hardware interface for the DCP 1020 as well as hardware and firmware 1060.

The hardware and firmware 1060 may comprise processor(s) 1062, input-output (I/O) interface(s) and devices 1064, and data storage 1066. The processor(s) 1062 may comprise microprocessors, state machines, systems on a chip, or the like to process the code of software such as compiled code of the Models 1022, 1024, and 1026, the host application 1029, the current paradigms 1040, and the operating system 1050.

The I/O interface(s) and devices 1064 may comprise one or more buses to couple with the processor(s) 1062 to facilitate access to code and data for executing compiled code of software such as the Models 1022, 1024, and 1026; the host application 1029; the current paradigms 1040; and the operating system 1050. For example, the I/O interface(s) and devices 1064 may comprise a memory control unit, an L2 cache controller, and a peripheral component interconnect (PCI) bridge. The memory control unit may further connect to a volatile random access memory (RAM) in the volatile memory 1070 of the data storage 1066. The RAM memory may comprise one or more memory modules. The memory control unit, or memory controller, may include the logic for mapping addresses to and from the processor(s) 1062 to particular areas of RAM. The cache controller may operatively couple the processor(s) 1062 to the L2 cache memory. The PCI bridge may provide an interface between a host bus and a PCI bus. The PCI bus may couple with a plurality of PCI expansion connectors for receiving PCI bus compatible peripheral cards and, in some embodiments, one such peripheral card may be a video controller. The video controller may include video memory and may couple to the monitor or video display terminal.

In the present embodiments, the I/O interface(s) and devices 1064 may comprise a network controller card (NIC) and/or a wireless local area network card to interface the network 1080 and to communicate with the devices 1082, 1086, and 1090 via the network 1080. In some embodiments, the I/O interface(s) and devices 1064 may also comprise a chipset 216 comprising a bus control and timing unit, a plurality of timers, an interrupt controller, a direct memory access (DMA) unit, nonvolatile CMOS RAM (also herein referred to as NVRAM), a CMOS real-time clock (RTC), a Flash memory interface, a PCI/ISA bridge, an integrated drive electronics (IDE) controller, and power management circuitry. The PCI/ISA Bridge may provide an interface between the PCI bus and an optional feature or expansion bus such as the Industry Standard Architecture (ISA) bus.

In several embodiments, the I/O interface(s) and devices 1064 may comprise a variety of I/O adapters and other components such as a universal serial bus (USB) port, a parallel adapter, and a keyboard controller. The keyboard controller may serve as the interface for the keyboard connector and the mouse connector.

The data storage 1066 may comprise one or more storage medium such as volatile memory 1070 or nonvolatile media 1072. The volatile memory 1070 may comprise memory such as dynamic random access memory (DRAM), buffers, registers, cache, or the like. The nonvolatile media 1072 may comprise memory 1076 such as read only memory (ROM), flash memory, or the like and drives 1074 such as hard disk drives, solid-state drives, optical drives, or the like.

The network 1080 may represent an interconnection of a number of networks. For instance, the network 1080 may couple with a wide area network such as the Internet or an intranet and may interconnect local devices wired or wirelessly interconnected via one or more hubs, routers, or switches. In the present embodiment, network 1080 communicatively couples devices 1010, 1082, 1086, and 1090.

Figure 2:
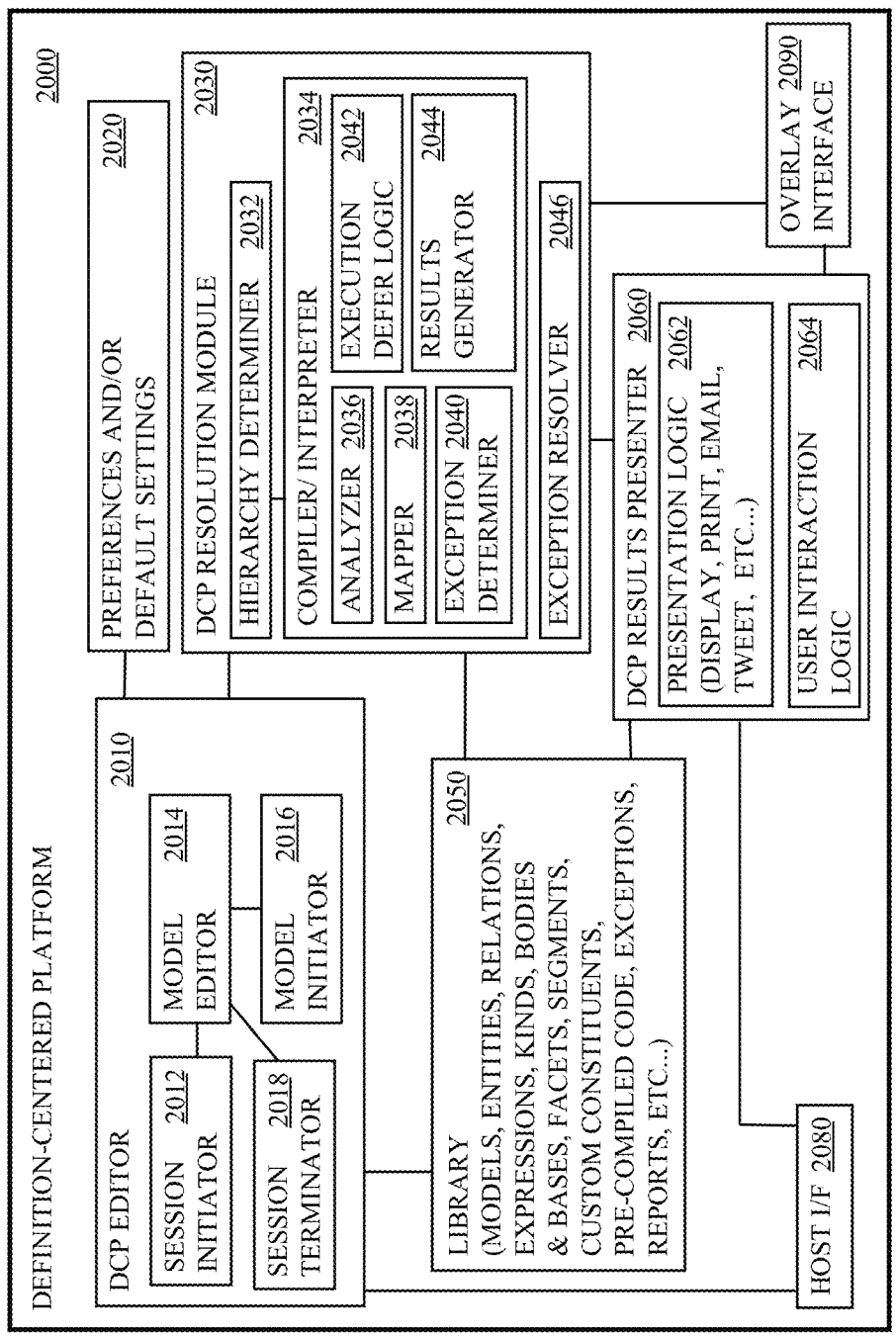
FIG. 2 depicts an embodiment of a definition of an object added to a library and an instance of the object added into a model.
Figure 3:
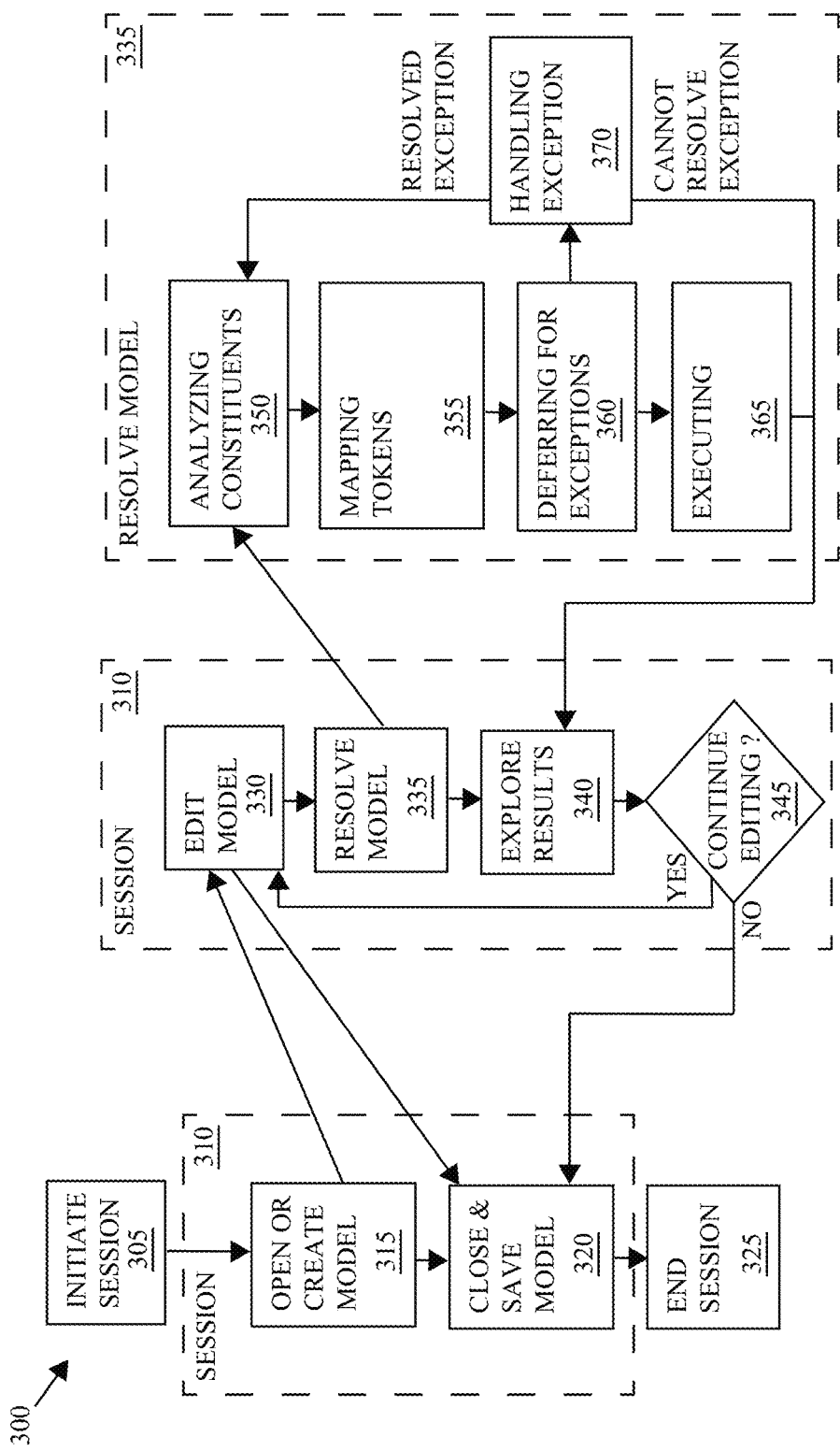
FIG. 3 depicts an embodiment of a flowchart for a definition-centered platform.

Referring now to FIGS. 2 and 3. FIG. 2 depicts an embodiment of an apparatus comprising a definition-centered platform (DCP) 2000 for creating, modifying, interpreting, and/or executing an application via an object oriented, Model hierarchy. FIG. 3 depicts an embodiment of a flowchart 300 for executing a DCP such as the DCP 2000. The following discussions will describe the components of the DCP 2000 in conjunction with the embodiment of the flowchart 300 that describes the functionality of the DCP 2000.

The DCP 2000 may comprise logic to perform functions that may be implemented in hardware and code within the hardware. The DCP 2000 may comprise a DCP Editor 2010, preferences and/or default settings 2020, a DCP resolution module 2030, a Library 2050, a DCP results presenter 2060, a host interface 2080, and an overlay interface 2090.

The DCP Editor 2010 may facilitate initiating a Session 305 and terminating a Session 325. During the Session 310, a user may create a new Model or open and edit an existing Model 315, and initiate resolution of a Model 335. For example, a user may open the DCP 2000, which may comprise, e.g., a standalone application within a processing device or an add-in application embedded in another software application such as a spreadsheet within a processing device. The DCP 2000 may initiate the DCP Editor 2010. The DCP Editor 2010 may provide the user with a number of options in the form of menu options and/or questions that are presented to the user via, e.g., a graphical user interface. The DCP Editor 2010 may provide the number of options by means of the host operating system or host application through a host interface (I/F) 2080 or by means of an underlying platform via an overlay interface 2090.

In many embodiments, the user may have menu selections to initiate a Session 305 or terminate an open Session 325. The Session Initiator 2012 may initiate a Session 310 in which a user may create, edit, or resolve Models. The Session 310 may be an environment for opening, creating, editing, resolving, and/or exploring results of a Model that includes, e.g., access to tools for creating and editing Models such as the Library 2050. And the Session Terminator 2018 may end a Session 310 and may include, e.g., potentially useful user prompts such as prompts to save changes to a Model, a Custom Constituent, or to rules or reports.

The Library 2050 may comprise Models and definitions of Constituents of Models, default rules for resolution of Models and/or Constituents, default reports for Models, Custom Models, definitions of Custom Constituents, Custom reports for Models, static Expressions, dynamic Expressions, precompiled code for Models or portions of Models with static Expressions, default rules for handling exceptions, default reports for presenting results to a user, and the like. In such embodiments, the default reports may define the form of the information or data to present to the user, the method of outputting information to the user, how a user may explore the results of resolutions of the Models in, e.g., a debugging mode and/or a standalone execution mode, and the like.

The Library 2050 may have, in some embodiments, standard content such as the Models and definitions of the Constituents that is designed for general usage for creating and editing many types of code. In further embodiments, the Library 2050 may comprise specialized content for creating and editing specific types of code or at least more narrowly tailored content for building specific types of code with the DCP 2000. For example, a Library for an add-in function for a spreadsheet may comprise, e.g., a financial Library that includes content such as Models, Constituents, and reports that are more specifically tailored for financial processes. As a further example, the Library for an add-in function for a spreadsheet may comprise, e.g., a real estate sales Library that includes content such as Models, Constituents, and reports that are more specifically tailored for real estate sales. In such embodiments, the more narrowly tailored Library 2050 may help a user to create the code since the user does not have to review non-useful items with respect to real estate sales in the Library 2050 while determining if a pre-constructed Model may be the best to use or edit for a particular project.

In some embodiments, the Library 2050 may comprise not only all the more general usage content but also narrowly tailored content. In such embodiments, the DCP 2000 may include functionality to filter the content of the Library 2050 for particular types of usages. In one embodiment, the Session Initiator 2012 may offer to a user an option to open a Session 310 with a narrowly tailored Library access such that during the Session, the user may only perceive a Library with a subset of the content of the Library 2050. In some embodiments, more than one Session may be opened concurrently to allow the creating, editing, debugging, and/or executing more than one Models and/or more than one instances of the same Model simultaneously. In many of these embodiments, the Session Initiator 2012 may offer to a user an option to open each Session with one or more subsets of content in the Library 2050. So a user, for instance, can start a first Session with a first Library content subset for editing a Model and then start a second Session with a second Library content subset for editing the Model.

In some embodiments, the Library 2050 may comprise definitions for Constituents that are adapted for integration with data migration systems. Such systems may include, for instance, a secure, Web-Enabled Data Migration, Data Integration, and Business Intelligence tool. The system may have the ability to integrate and perform data mining of legacy systems, packaged applications, disparate operating platforms, heterogeneous database management systems, file systems, and communication protocols within and among organizations and across geographically dispersed areas without needing any traditional programming resources. Such data may be returned as current context for a Model or as data to replace a token of an Expression in a Model.

In many embodiments, each Constituent within a Model has a given Kind that determines its static features from the underlying platform. And every Kind of Constituent has a corresponding Kind. A Kind may include additional features beyond the features of the Type in other contemporary object-oriented languages, and these additional features may be dynamic or static. The user is able to make Kinds of Kinds, which are Kind objects that instantiate other Kind objects. Each Kind has a set of members, which enable capabilities for its instances such as fields, methods, events, etc. The members of a Kind Of Kind may be designated as Broad, enabling them to be accessed not just by instances, but also by instances of instances of the given Kind of Kind. Each Kind is derived from another Kind, except for the Kind for Object, which has no base. The Kind of Kinds also obey a hierarchy, where the Kind of a given kind1 is also the same or derived from the Kind of kind1's base.

Figure 2A:
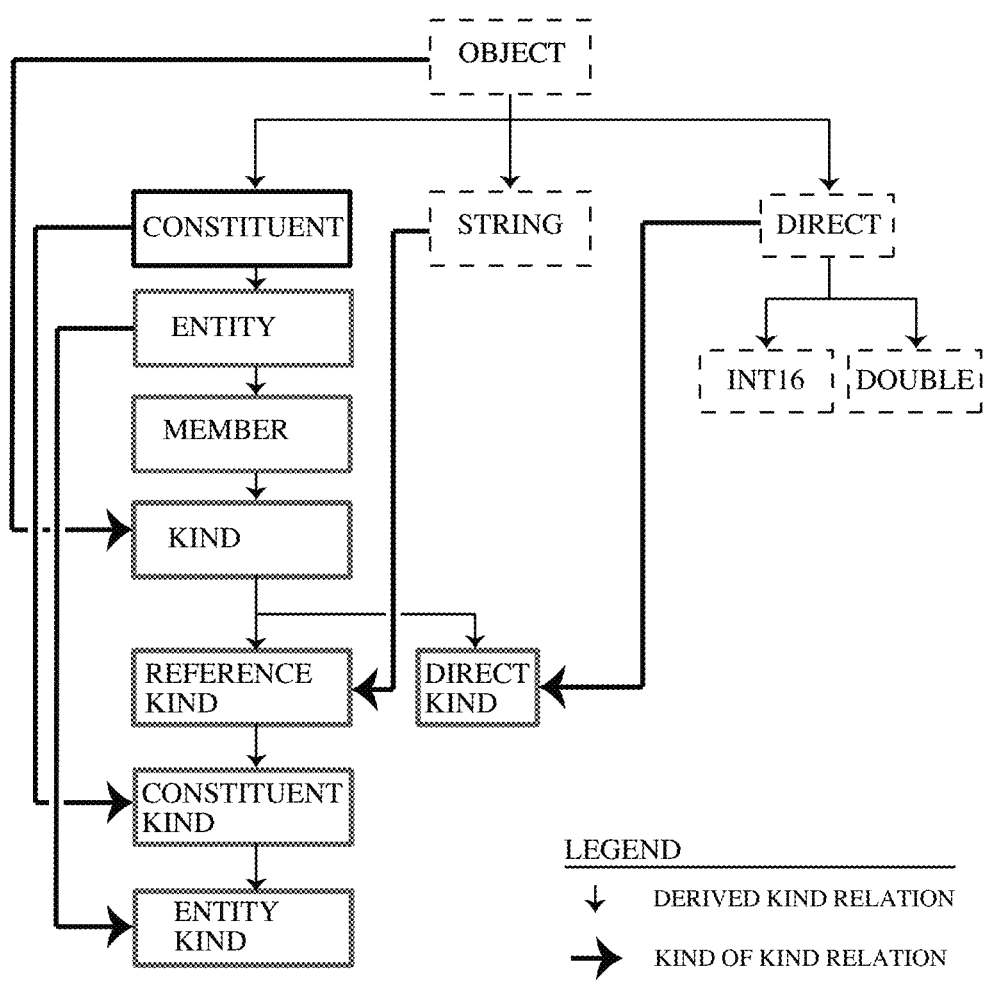
FIG. 2A depicts an embodiment of an object hierarchy.

Referring now to FIGS. 2 and 2A, FIG. 2A is a diagram of an embodiment of an object hierarchy 2100 that shows the Object and the Kinds and Kinds of Kinds. The Object is a general description of an object of an object-oriented programming paradigm. The illustration of the String under Object represents a Type of Object that is currently in use in other paradigms. The object hierarchy 2100 also includes a Direct object, which may include an integer, INT16, or a Double. A Direct may be an Object in which the data of an instance is stored directly in the instance's memory location as opposed to a Reference for which an instance may be stored indirectly. An example of a Reference is an offset in memory. Int16 may be an Object that represents an integer with 16 bits of data and Double may be an Object that represents a floating point number with double precision, based on a processor in the system. For embodiments herein, the Objects of String and Direct are referred to as Kinds because Objects unique to embodiments described herein may define Kind of Kind Relationships with String and Direct.

In the present embodiment, the definition-centered paradigm (DCP) of the object hierarchy 2100 also includes a Constituent. The Constituent may include an Entity and may also include one or more Relations. An Entity may comprise one or more child Entities such as a Member, a Kind, a ReferenceKind, a DirectKind, a ConstituentKind, or an EntityKind. Boxes below each other indicate that each Kind is derived from the Kind above. The arrows to the boxes from the parent Entity to the Kind instances indicate the Kind of the Kinds that are created.

The Kind box represents an Entity that defines the Kind of the Entity box. The ReferenceKind, DirectKind, ConstituentKind, and EntityKind are Kinds of the Kind of Entity. A Kind Inheritance Hierarchy is explained in more depth in conjunction with FIG. 11. Deriving a kind from a given base kind is different than instantiating a kind from another kind. Deriving a kind (derivedKind) from a base kind (baseKind) is performed by specifying inheritance from baseKind, which may be done by, e.g., specifying the Base property of the derivedKind. This enables derivedKind to inherit the members of baseKind, and modify/add members as necessary, including additions to the instance data structure design. Instantiating a kind (kindInstance) from another kind (kindSource) creates a kind of that given kindSource. This enables the kindInstance to fulfill the values for the members of the data structure specified by kindSource.

An instance of a given kind may utilize the members that are defined in the kind. These members may enable features such as fields of a data structure or routines (logic in the form of code) that can be executed. An instance may be able to directly utilize the members of its kind, but not necessarily the members of its kind's kinds. Specified members of the kind's kinds may be replicated for access to instance's instances if needed.

Figure 2B:
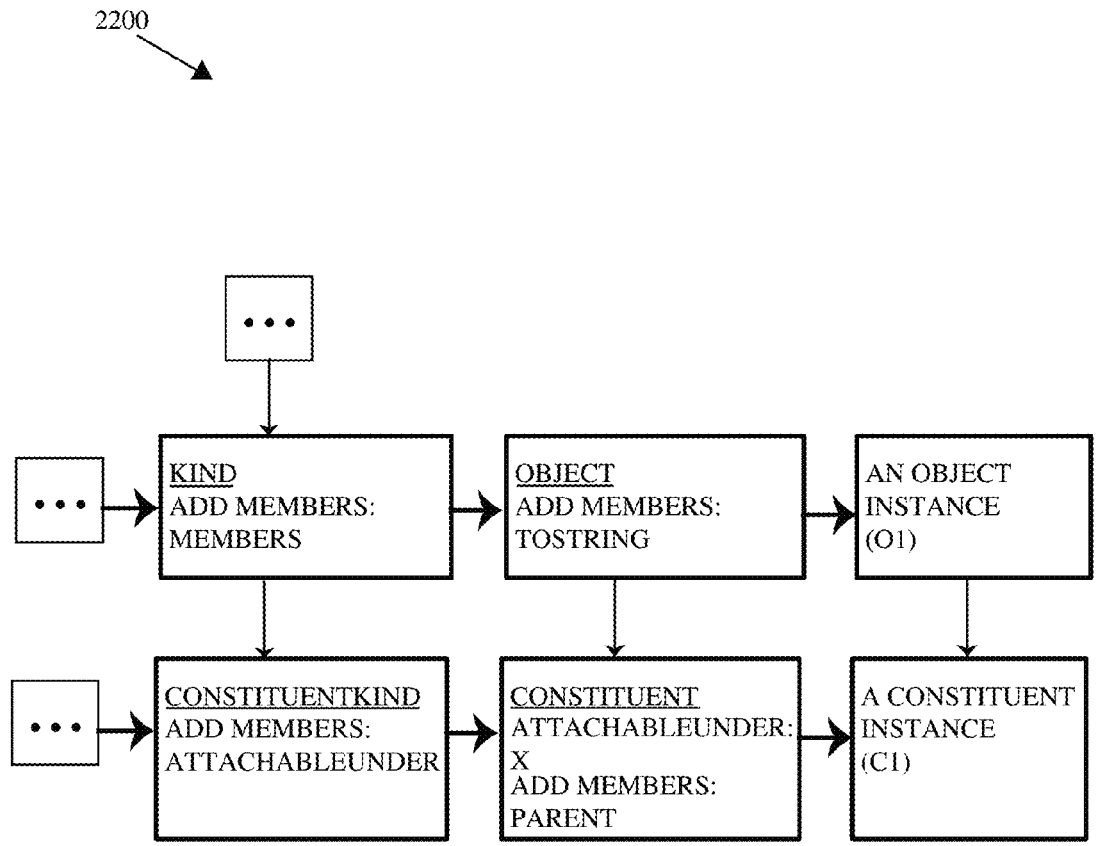
FIG. 2B depicts an embodiment of object relationships.

As an example, FIG. 2B illustrates an embodiment 2200 of the relationship of a few kinds through both base/derived and kind/instance. Each box represents a unique instance of some kind and some of the properties of that instance, such as the members that a kind adds to those of its base kind.

The box for Object shows that it has no base, adds the member ToString, and has a kind called Kind. An example of and instance created from Object is the Object instance marked O1. Object instance O1 can utilize the members defined in its kind, which in this case is only the member called ToString.

The box for Kind shows that it is derived from a base (not shown) to which it adds the member 'Members', and is a Kind of some Kind that is not shown. An example of an instance created from Kind is the box marked Object. Object can utilize the members stipulated in its kind, which comprises at least the member Members.

The box for ConstituentKind has a base of Kind to which it adds the member 'AttachableUnder', and is a Kind of some Kind that is not shown. An instance made from ConstituentKind is the box marked Constituent. Constituent is an instance of ConstituentKind that can utilize the members stipulated in its kind, which is both the members Members and AttachableUnder.

The box for Constituent shows that it has a base of Object to which it adds the member 'Parent', and that it has a kind of ConstituentKind. An example of an instance made from Constituent is the Constituent instance marked C1. Constituent instance C1 can utilize the members stipulated in its kind, which comprises at least the members ToString, AttachableUnder, and Parent.

Note that, in many embodiments, the kind of a given kind (derivedKind) may be different than the kind of its base kind (baseKind). Some embodiments may constrain the kind of a derivedKind, by, for instance, requiring the kind of baseKind to be Assignable from the kind of derivedKind. Instances of a derivedKind may be utilized in places where instances of the baseKind are called for, even if they have different kinds. This approach is different from current computing platforms that do not allow instantiation of different kinds of kinds (instead only 'RunTime' types are instantiated), and do not allow assignability of kinds across different kinds of kinds (RunTime types are only assignable to other RunTime types).

The Corresponding Type of a kind is a type in the underlying platform that has a one to one relationship with the given kind. An instance of a given kind is also an instance of its Corresponding Type.

The base/derived hierarchy of a kind system (or the base/derived hierarchy of the corresponding type system of an underlying platform) is also referred to as the Inheritance Hierarchy.

Note that the relationship between a kind (Derived) and its base (Base) may be identical to relationship of the corresponding type of Derived and the corresponding type of Base. However, the corresponding type of the kind of Derived does not have to match the corresponding type of the kind of Base. This is because instantiable types within an underlying platform are all typically of the same type (e.g. RuntimeType) whereas, in many embodiments, in the DCP platform instantiable kinds can be of a different kind.

In several embodiments, a SourceKind is set to be Assignable from ActualKind kind when any of the following are true: (1) both are the same kind (2) ActualKind is derived from SourceKind, either directly or indirectly or (3) ActualKind implements the SourceKind by establishing a relationship between the members of ActualKind and SourceKind.

As an example of kindKind, EntityKind may be derived from Kind and introduce the member Stages. This would allow kinds that are made by EntityKind to have a property called Stages. Stages may be used to specify the stages of progress for an instance of a given EntityKind instance. If a kind is not made a kind derived from EntityKind, it would not have that Stages property.

Stage is a kind derived from Member that can be included in the members of an EntityKind. A Stage may specify a method, e.g., in the form of code that is executed when instances of the EntityKind are progressed forward (towards Realization) and another method, e.g., in the form of code that is executed when instances of the EntityKind are progressed backwards (towards Termination). Each Entity instance has a specific Stage as part of its state.

To illustrate, the Library 2050 may comprise definitions for Entities such as an Edifice, an Expression, a Routine, a Symbol, and a Kind. An Entity is a type of Constituent that can be defined using a single expression, and can be resolved. An Entity's definition can contain one or more SubExpressions that can be resolved to determine their values, leading to the Entity's value. Expressions may comprise code including numbers, characters, alphanumeric sequences, strings, tokens, sentences or paragraphs, variables, formulas, equations, and/or any other representation of data that can be resolved. The Expressions can be part of a data structure such as a Series, a List, a Table, an array, a Matrix, and/or any other form of data structure that can contain an Expression but may also have explicit, implicit, or inherent relationships between the Expressions in the data structure. In many embodiments, custom Entities can be created by creating a data structure to contain one or more Expressions with explicit, implicit, or inherent relationships between the Expressions in the data structure. Note that the number of different types of Entities is not limited to those discussed herein. The value can be any type of data such as a number, a character, an alphanumeric sequence, a string, a sentence or paragraph, a variable, a formula, an Expression, and/or any other representation. A value that is an Expression may, for instance, serve as input via a token into another Expression or be a result that is desirable to a user. The token is a similar a variable in an equation that references a value from another source such as another Entity, an Entity of another Model, an Entity of another realized Model instance, a realized Model instance, or any other addressable or otherwise accessible source of data.

An Edifice is a type of Entity that can contain positions and/or values within cells of those positions. A FixedEdifice is a type of Edifice for a single Body or Basis. A Blend is a type of FixedEdifice for a blend of unique Dimensions. The Blend is a Basis. A Dimension is a type of FixedEdifice for a list of cells of a given type and is a Basis and Body and can contain zero, one, or more cells. And a Matrix is a type of FixedEdifice with cells of a given type from a separate Basis.

A Body is a type of Entity that contains a Basis and has a cell for each permutation of the dimension cells within its Basis that can contain a value of a given Kind. A Basis is a type of Entity that contains a set of zero, one, or more unique Dimensions in a specific sequence. The Matrix is a Body.

An Expression may be a type of Entity that can contain executable code that can be evaluated. The Expression may or may not be affected by a given context. An Expression(Of thisType) is a type of Expression that returns a result of thisType. An EverExpression is a type of Expression(Of EverExpression) that always returns a result of type EverExpression. A Routine is a type of Entity that contains an Expression and parameters that can be evaluated with arguments of the given type. A Symbol is a type of Entity that refers to an undetermined abstraction. Assumptions may be stipulated for Symbols. An Expression may be a type of Kind, where it can be instantiated to produce an evaluation. A Routine may be a type of Expression, where it can be instantiated with a set of arguments to produce an evaluation.

A Kind may be a type of Entity that is used to create a declarable reference to a kind of Object. A Kind may contain Members, which are means to process or access objects relative to a given instance of the Kind. A ConstituentKind is a type of Kind, which is used to make Constituents. An EntityKind is a type of ConstituentKind used to create Entities, and may contain Facets and Stages. A Stage describes a state for an Entity instance that is being realized or terminated from a Model. Each EntityKind can have a set of Stages, which includes Stages inherited from its base Kind. The Stages can be executed ('progressed') in either a forward sequence or backward sequence. Executing in forward sequence ends at the final stage, indicating that the given Entity instance has been realized. Executing in backward sequence ends at the final stage indicating that the given Entity instance has been terminated/removed from the Model it was a part of. A Facet is a type of Member that enables instances of the Entity to supply an Expression that is evaluated within the Entity instance's context to fulfill the Facet. A RelationKind is a type of ConstituentKind used to create Relations. A RoutineKind is a type of Kind that specifies a routine that instances of the Kind can utilize. In many embodiments, Entities may be edited to change the data structure of the Entity and/or change rules associated with resolution of the Entity, effectively creating a custom or new Entity.

Figure 7:
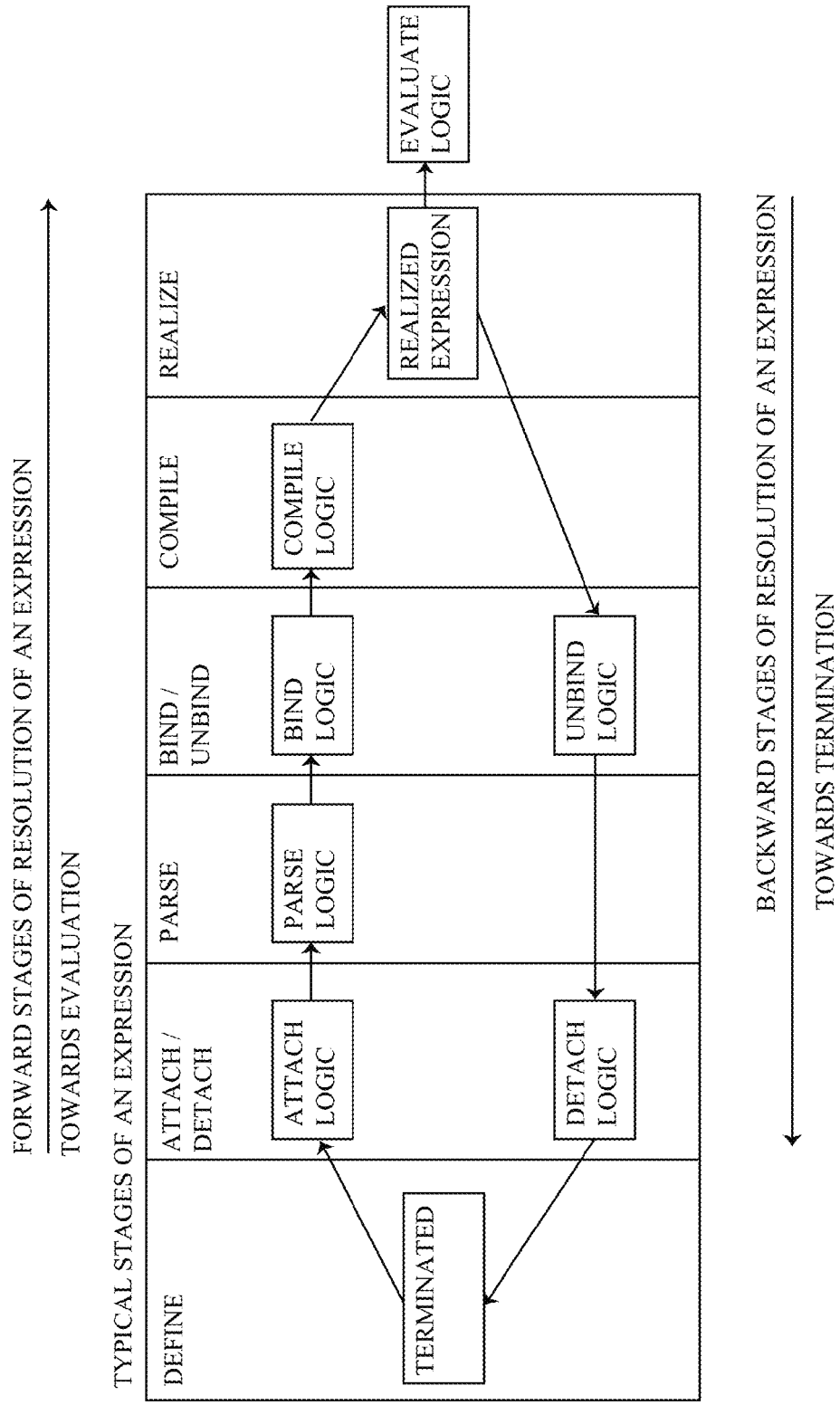
FIG. 7 depicts an embodiment of typical stages of an expression for a definition-centered platform.

Referring now to FIGS. 2 and 7, FIG. 7 illustrates an embodiment of stages of an expression 6000. The stages of an expression 7000 generally describe an expression in a Model from the definition of an object in the Model in the DEFINE stage through to evaluation of the object in the model. Note also that objects in a Model may progress forward through the stages toward evaluation or backwards through the stages towards termination.

In this embodiment, each stage includes logic such as execution of code in a processor or by a state machine. Each stage is illustrated in a separate box for illustration purposes and are just examples of the stages performed. In other embodiments, more stages may be added or some of these stages may be skipped or combined with other stages.

The form of the execution logic of each box is not critical, but, in the present embodiment they comprise Attach and Detach logic in the ATTACH/DETACH stage, parse logic in the PARSE stage, bind and unbind logic in the BIND/UNBIND stage, compile logic in the COMPILE stage, realize logic in the REALIZE stage, and evaluate logic.

In the ATTACH/DETACH stage, the attach logic connects the Entity to a parent Entity via a parent Relation. The detach logic detaches the Entity from a parent Entity. Detachment may occur for various reasons including, for example, code that dynamically modifies the Model during execution or a modification of the Model by a user.

In the PARSE stage, the expression code is divided into text tokens. In other words, the expression is parsed to determine the terms of the expression such that, for example, terms associated with functionality may be assigned that functionality in a later stage.

In the BIND/UNBIND stage, the bind logic identifies what the text tokens refer to by looking at the available members in the context of the object in the Model and establishes the relationship between the text tokens and the referenced member(s) in the context of the object in the Model. The unbind logic may unbind the text token from the relations between the text tokens and the referenced member(s) in the context of the object in the Model.

In the COMPILE stage, compile logic converts the binding to executable code. In the REALIZE stage, the compiled expression is not yet evaluated. Note that compilation may occur prior to execution of the Model in some embodiments and may occur at runtime in some embodiments. Runtime compilation may be necessary for Models that comprise members that cannot be evaluated until execution although, in some embodiments, the Model may be partially compiled prior to runtime and runtime compilation may complete during execution of the Model.

Note that the Bind and UnBind logic as well as Attach and Detach logic reside in the same stages, but represent the forward and backward routines of the corresponding stage. The forward or backward routine may execute depending on whether the Entity is being realized or terminated. The initial stage of an Entity is normally Terminated, whereas the final stage of an Entity is normally Realized. Once every Entity within the scope of a resolution achieves a Terminated or Realized state, the resolution may be completed. Entities may also encounter errors during their resolution, which would prevent the resolution from proceeding to completion. Again, the stages that an individual Entity must pass through are specified by the Entity's Kind (which is a Kind object or a Kind of a Kind object). The stages specified by a Kind or a Kind of a Kind object includes those inherited from its base or parent Kind and any additional stages defined in that base or parent Kind.

Entities are progressed across their stages during a resolution (i.e. progression). The user may initiate a progression or it may be initiated automatically when Entities are redefined or some other situation occurs, according to specified settings. A resolution will continue until Entities within the scope of the resolution are progressed to realization, termination, error, or until the resolution is interrupted or stopped.

The Library 2050 may also comprise definitions for Relations such as a Fulfillment Relation, a Segment, a Supplement, a Transient, and a Fragment. A Relation is a type of Constituent. A Relation is the base class for other types that are used to reference specific properties of their creator Entity, and are often used to relate to a child Entity. A Fulfillment Relation may be a type of Relation that refers to a child entity that fulfills a given Facet. A Segment may be a type of Relation that refers to positions or cells of an Edifice. A Supplement is a type of Relation that connects supplemental Entities to be resolved after a main Entity is resolved. A Transient is a type of Relation that connects Entities that are created within a realized Model instance during the resolution of an Entity, where the transient Entity is not the direct construction. A Fragment may be a type of Relation that refers to a sub-Expression.

In many embodiments, these Entities and Relations may be edited to change the data structure of the Entity, data structure type of the Entity, interface type of the Relation, Expressions, and/or change rules associated with resolution of these Constituents, effectively creating custom or new Constituents.

The DCP Editor 2010 may provide access to the preferences and/or default settings 2020 to let a user choose the preferences relating to handling of exceptions such as the notification of the user of the existence of an exception that cannot be resolved; default exception handling by, e.g., identifying one or more sets of rules for handling the exceptions 370 in the Library 2050; default forms of output such as output via texting, email, presentation on a display, etc.; default reports for presentation of the resolution of Entities and Models; preferences and default reports related to debugging and testing Models; and the like. Further preferences and/or defaults that the user may set in some embodiments may include preferences related to analyzing constituents such as the inclusion or exclusion of a pre-resolution hierarchy determination by hierarchy determiner 2032, preferences relating to variations of rules associated with resolution of Constituents, and the like.

The DCP Editor 2010 may comprise a Model Editor 2014 to open or create a Model 315, to edit a Model 330, and to close or save a Model 320. The Model Editor 2014 may provide access to the Library 2050 for opening and editing Models as well as for saving Models so the saved Models may be accessed from the Library 2050 in other Sessions. In many embodiments, the Model Editor 2014 may access the operating system directly or via or a host application via the host I/F 2080 for the purposes of opening and saving Models. Models may be saved as standalone Model files or embedded in other types of files such as spreadsheet files, workbook files, word processing files, and/or text files. In some embodiments, the Model Editor 2014 may facilitate access to preferences, default settings, options, rules, host I/F rules, and/or the like for the Model being edited for use during resolution of the Model. For example, while the user may desire to set default or more generalized preferences for editing various types of Models, the user may desire to set preferences, rules, options, default settings, and the like 2020 specifically for resolving a realized instance of a Model. For example, the preferences of the Model may include or exclude the use of one or more particular overlaid paradigms or host software applications. In some embodiments, the user may not desire to include the overlay interface 2090 as being unnecessary for the operation of the Model. Such preferences and settings may be stored in the Model file such that the settings and preferences are available regardless of the instance of the DCP 2000 or DCP application that is executed to resolve the Model.

Note that embodiments can create a Model instance (or an instance of any other Entity) that is not realized and perform actions on it. Realized means that the Entity has progressed forward up to its last stage, performing whatever forward routines are specified in each of those stages. Embodiments can perform actions on an Entity, including making changes to it, even though it is not Realized.

After editing a Model, the Model Editor 2014 may offer the option to the user to save and close the Model 320 without resolving the Model such as in situations in which the Model is incomplete. The Model Editor 2014 may also couple with a Model Initiator 2016 to resolve 335 a realized instance of a Model during the Session 310. The Model Initiator 2016 may capture the current context for the Model, or may provide a default context or a testing context, if preferences and/or defaults 2020 indicate that a default or testing context may be provided with the Model for resolution 335. In some embodiments, the Model Initiator 2016 may provide a window or pull-down menu options for selecting the context to insert with the Model to create a realized Model to present to the DCP Resolution Module 2030.

The context of a Model may comprise input based upon values in the environment of the Model that replace context tokens in Expressions of the Model. A Model with the context inserted into the Expressions for the context tokens may be referenced as a realized Model because the realized Model is ready for resolution.

After inserting the context, the realized Model is communicated to the DCP Resolution Model 2030. In some embodiments, the DCP Resolution Module 2030 may comprise a hierarchy determiner 2032, a Compiler/Interpreter 2034, and an Exception Resolver 2046. In further embodiments, the DCP Resolution Module 2030 comprises the Compiler/Interpreter 2034 and the Exception Resolver 2046. In several embodiments, the hierarchy determiner 2032 may be turned off such that the functionality is skipped as a preference in the preferences and/or settings 2020.

The hierarchy determiner 2032 may perform an initial sort of Expressions in the realized Model based upon tokens included in the Expressions. For instance, the hierarchy determiner 2032 may perform a first sort to move Expressions that do not have tokens to the top of the list such that these tokenless Expressions are resolved first. A reason to resolve the tokenless Expressions first is that these tokenless Expressions are not dependent upon values of other Constituents in the realized Model for resolution and there is a possibility that one or more tokens in other Expressions refer to these tokenless Expressions. In some embodiments, the sorting of the Expressions ends after this first sort. In further embodiments, the hierarchy determiner 2032 may perform a second sort to place Expressions that have tokens associated with a tokenless Expression next in the list for resolution. In some embodiments, the sorting of the Expressions ends after this second sort. In further embodiments, the hierarchy determiner 2032 may perform a third sort to place Expressions that have tokens associated with the results of the second sort next in the list for resolution. In some embodiments, the sorting can continue until either all Expressions have been placed into a position in the list for sorting or until the sorting has reached the maximum number of tokens in an Expression of the realized Model minus one.

In several embodiments, the hierarchy determiner 2032 may store the order of resolution in the Library 2050 with the Model such that the hierarchy determiner 2032 is skipped the next time the Model is resolved 335. In further embodiments, the user may create an order of resolution and store the order of resolution in the Library 2050 such that the hierarchy determiner 2032 may be skipped when the Model is resolved 335. Note that some Models comprise context tokens that include tokens that may vary depending on the current context of the Model and some Models comprise Constituents that create other Constituents during resolution. As a result, some Models may be sorted after the context is inserted into the Models and communicated to the DCP Resolution Module 2030.

Some embodiments skip the hierarchy determiner 2032 or do not comprise the hierarchy determiner 2032 because the compiler/interpreter 2034 can resolve the realized Model regardless of the order of Expressions. The compiler/interpreter 2034 may resolve the resolvable Expressions while interpreting, compiling, and executing the Expressions of the realized Model. The compiler/interpreter 2034 may comprise an analyzer 2036, a mapper 2038, an exception determiner 2040, an execution defer logic 2042, and a results generator 2044. The analyzer 2036 may analyze Constituents 350 to determine the Constituents with Expression that contain tokens. The mapper 2038 may map tokens 355 to corresponding locations with data to satisfy the tokens. Note that if the tokens point to external values or sources of data then these tokens are consider to be context tokens so the context would have already been inserted by the Map Initiator 2016 prior to resolution by the DCP Resolution Module 2030. The tokens remaining may be, e.g., tokens inserted as part of the context, tokens in created Entities during resolution such as Transient Entities, and tokens that reference values in other Constituents within the Model or within another Model that may be resolved concurrently by the DCP 2000.

While the mapper 2038 maps the tokens 355, the mapper 2038 may insert the values into the Expressions for the tokens. If the value that a token references has not been resolved, this event is referred to as an exception and the execution defer logic 2042 may defer execution 360 of the Expression in response to the exception. The deferral of execution of the Expression 360 may be subject to Exception Handling 370 as defined in exception handling rules set out in the Library 2050. In some embodiments, more then one sets of exception handling rules may reside in the Library 2050 and the user may have an opportunity to set or change a default set of exception handling rules generally for all Models or may select a particular set of exception handling rules for the Model. In some embodiments, the default set of exception handling rules may differ depending upon whether the user activated debugging tools for resolution of this Model.

In many embodiments, the resolution of the Expression may await resolution of the value to which the token of the Expression refers and then the Expression may be resolved and executed. If, however, the value to which the token of the Expression refers is not resolved, the Expression cannot be resolved and the Exception Resolver 2046 may execute the appropriate course of action indicated in the set of exception handling rules such as to notify the user by, e.g., displaying or otherwise outputting via the DCP Results Presenter 2060 and the host I/F 2080 the exception and the Expression with the token and address of the corresponding Constituent in the Model to the user.

If there is no exception in resolving an Expression or once the exception has been cleared by, e.g., resolution of another Constituent that had to be resolved prior to resolution of the Expression, the results generator 2044 may generate results of the realized Model by compiling or interpreting and executing 365 the Expression. In many embodiments, the compilation or interpretation may comprise a runtime compilation. In several embodiments, static portions of code for a Model in the Library 2050 may be pre-compiled and stored in the Library 2050 with the Model to reduce the compilation time. The results of executing 365 the realized Model comprises the values determined for each of the Expressions in the Model.

After the results are generated for the realized Model, the DCP Results Presenter 2060 may generate an output based upon the results to present the results to a user so the user may explore the results 340. The DCP Results Presenter 2060 may couple with the host I/F 2080 and/or the overlay I/F 2090 to present an output based upon the results to the user. The DCP Results Presenter 2060 may generate an output for the user based upon one or more reports in the Library 2050. In some embodiments, the user may select a report or set of reports as default reports generally or specifically for the realized Model in the preferences and/or default settings 2020. Furthermore, the user may select a report or set of reports specifically for resolution of this Model or for resolution of this specific realized Model in the preferences and/or default settings 2020. In several embodiments, the report or set of reports may be associated with a preference to implement debugging tools for the resolution of the realized Model. In several embodiments, a report or set of reports may present values of the realized Model and/or Constituents of the realized Model to the user via one or more communications means such as displaying the output via a graphical user interface generated via the operating system or a host application by means of the host I/F or via a current paradigm via the overlay I/F 2090. In further embodiments, the report or set of reports may present values of the realized Model and/or Constituents of the realized Model to the user via printing, emailing, faxing, tweeting, texting, and/or the like.

The DCP Results Presenter 2060 may comprise a presentation logic 2062 to determine and execute an output of one or more reports to the user related to the results. And the DCP Results Presenter 2060 may comprise a User Interaction Logic 2064 that allows the reports to be explored by a user. For example, a report may comprise one or more Expressions that are resolved based upon the values determined for the realized Model and for Constituents of the realized Model. In several embodiments, the reports may be explorable in that the user can select an output in the report and explore the values of the Model and the Expression that determined the output.

Figure 4:
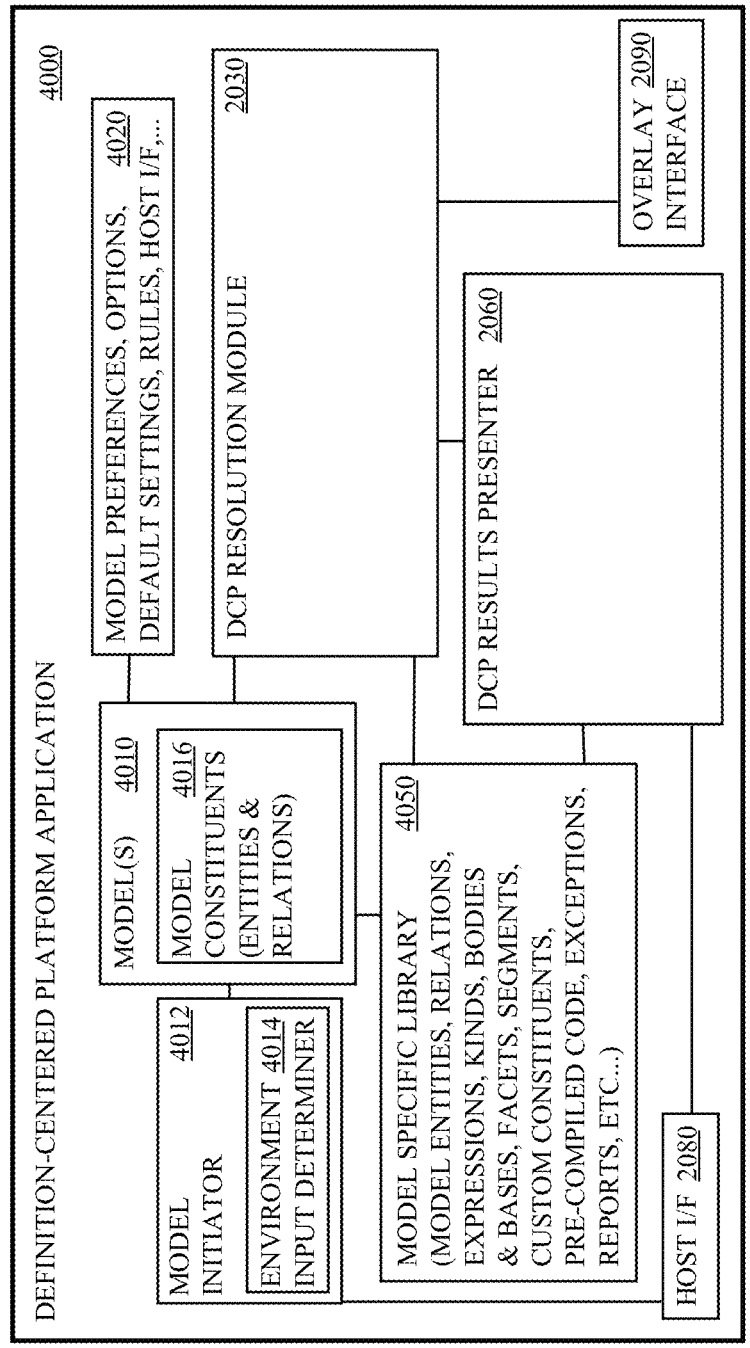
FIG. 4 depicts an embodiment of a definition-centered platform application.

FIG. 4 depicts an embodiment of a DCP application 4000. The DCP application 4000 differs from the DCP 2000 because it is a standalone application to execute one or more Models 4010. The DCP application 4000 provides the capabilities to interpret, compile, and execute the Model(s) 4010. In other embodiments, if the realized Model(s) 4010 do not require runtime compilation, the Model(s) 4010 may be pre-compiled and may only require the insertion of the context tokens from the current environment by the environment input determiner 4014 and the Model initiator 4012.

In the present embodiment, one or more Constituents of Model(s) 4010 require runtime compilation or interpretation. The DCP application 4000 may comprise a Model Initiator 4012; Model(s) 4010; Model preferences, options, Default settings, rules, host I/F rules, and the like 4020; a Model Specific Library 4050; as well as the DCP Resolution Module 2030, the DCP results presenter 2060, the host I/F 2080, and the overlay I/F 2090. In some embodiments, the overlay I/F 2090 may not be implemented and, in further embodiments, functionality of the DCP Resolution Module 2030 and/or the DCP presenter 2060 may be tailored specifically for the Model(s) 4010. For instance, in some embodiments, the DCP Resolution Module 2030 may not include a hierarchy determiner 2032 or the presentation logic 2062 may be specifically tailored for the preferred method(s) of interacting and communicating with the user.

In the present embodiment, the DCP application 4000 may comprise a Model Initiator 4014 to determine a realized instance of a Model(s) 4010. The Model Initiator 4012 may access the host application or the host operating system via the host I/F 2080 to determine a current context for the Model(s) 4010. The Model Initiator 4012 may comprise an environment input determiner 4014 to determine the current context. In many embodiments, the environment input determiner 4014 request input from the user for one or more tokens of the current context for the Model(s) 4010. In other embodiments, the environment input determiner 4014 may determine the current context from cells in a spreadsheet or locations in a word processing document that are identified by context tokens in Expressions of the Model(s) 4010.

The Model Initiator 4012 may insert the current context of a Model(s) 4010 into the Model(s) 4010, replacing context tokens in Expressions of the Model(s) 4010 to created realized Model(s) 4010 for resolution. The Model(s) 4010 may comprise one or more Model(s) for execution and the Model preferences, options, Default settings, rules, host I/F rules, and the like 4020 may establish preferences, defaults, options, and rules for resolving the Model(s) 4010. For example, the user may establish a custom or default rule for handling exceptions that are not resolvable, the user may select one or more options for communication of the exceptions to the user, the user may select one or more reports for presentation of results to the user, and the like.

The Model(s) 4010 may comprise Model Constituents 4016 such as Entities and Relations. In many embodiments, the inclusion of standard or custom Constituents from the Model Specific Library 4050 may be identified or referenced in the Model Constituents 4016 but the rules and default values for such Model(s) may reside in the Model Specific Library 4050. Thus, the DCP Resolution Module 2030 may access the Model Specific Library 4050 for the rules and default values or pre-compiled code for the rules and default values.

After inserting the context, the realized Model(s) 4010 are communicated to the DCP Resolution Model 2030. In some embodiments, the DCP Resolution Module 2030 may perform one or more pre-compilation sorts. In several embodiments, the DCP Resolution Module 2030 may resolve the Expressions in the Model(s), setting aside Expressions with unresolved tokens until the tokens can either be resolved or until the DCP Resolution Module 2030 determines that one or more of those expressions cannot be resolved. For example, the DCP Resolution Module 2030 may attempt to resolve a first Expression with a token that references a second Expression. Upon attempting to resolve the second Expression, the DCP Resolution Module 2030 may determine that the second Expression comprises a token referencing a value of the first Expression. The DCP Resolution Module 2030 may, in response, determine that the Expressions are unresolvable. In some embodiments, the DCP Resolution Module 2030 may simply reach the end of the resolutions and still fail to resolve the first and second Expressions. In other embodiments, the DCP Resolution Module 2030 may determine that the first and second Expression comprise circular references that will not be resolvable. An exception handler of the DCP Resolution Module 2030 may then determine, based upon default or custom rules for exception handling, determine whether to continue to resolve the Model(s) 4010 to the extent possible or whether to terminate resolution of the Model(s) 4010 and to report the errors via the DCP results presenter 2060.

The DCP results presenter 2060 may receive the results and/or errors from the DCP Resolution Module 2030 and may determine the process by which to report the results of the resolution to the user. In some embodiments, the DCP results presenter 2060 may be streamlined to provide the output that is selected for the Model(s) 4010 as indicated in reports, rules, preferences, and/or options. For example, the options may indicate that a high level result should be presented to the user at the conclusion of the resolution of the Model(s) 4010 including, for instance, the values of the Model(s) 4010 or an Expression resolved based upon the value of the Model(s) and/or Constituents of the Model(s). In other embodiments, the options may be indicated to present not only the high level result but also one or more of values of specific Constituents of the Model(s) 4010.

The Model Specific Library 2050 may comprise Model(s) 4010 and definitions of Constituents of Model(s) 4010, default rules for resolution of Model(s) 4010 and/or Constituents of the Model(s) 4010, default reports for Model(s) 4010, Custom reports for Model(s) 4010, precompiled code for the Model(s) 4010 or portions of Model(s) 4010 with static Expressions, default rules for handling exceptions, default reports for presenting results to a user, and the like. In such embodiments, the default reports may define the form of the information or data to present to the user, the method of outputting information to the user, how a user may explore the results of resolutions of the Model(s) 4010. In other embodiments, the DCP application 4000 may comprise a Library 2050 with standard or other content.

Figure 5:
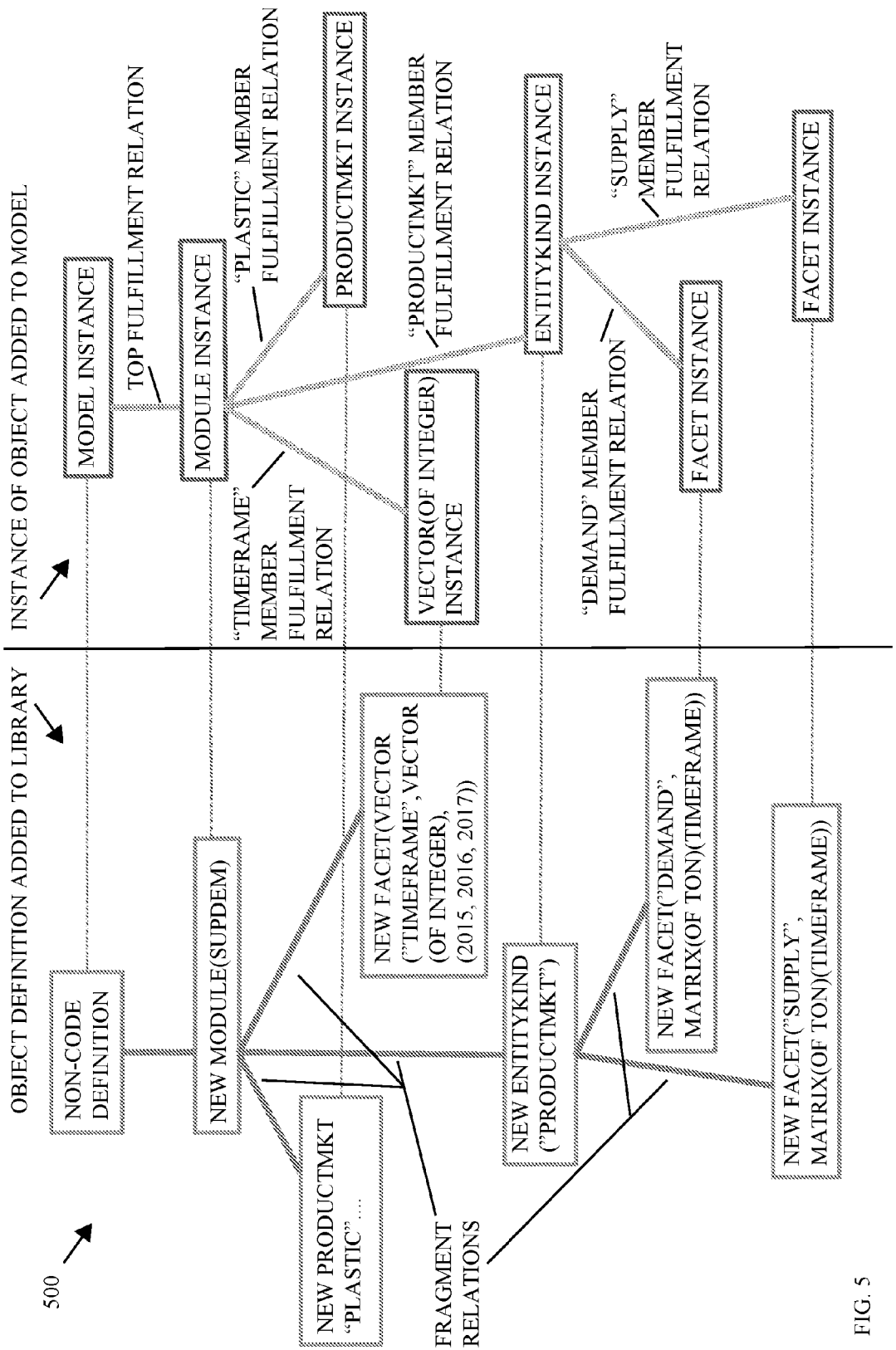
FIG. 5 depicts an embodiment of an object definition added to a library and an instance of that object added to a Model.

FIG. 5 depicts an embodiment 500 of an object definition added to a library and an instance of the object definition added to a Model. Embodiment 500 comprises a model template for Supply-Demand curves. The left hand side illustrates an embodiment of a definition for the model being added to a library, which can typically be stored in a file. The expression that defines a model could be, for example, loaded from a disk file or entered into a newly created Model by the user submitting in the code for that expression into an editor for the Model. A newly created Model may have an empty expression defining it, which the user can then modify accordingly. In the example indicated, each definition/expression is composed of sub expressions, connected by fragment relations.

Each Model's definition may then be resolved to create one or more Entities, each within a given context. In this example, the top level of the model is a Module, which is an object that can contain an arbitrary set of named members. This Module defines a vector "Timeframe", a Kind "ProductMkt" and an instance of that Kind named "Plastic". The fragments within ProductMkt are shown, and they include defining facets for "Supply" and "Demand". For brevity, the fragments for the fulfillment of those facets for Plastic are not shown.

Note that in the above example, only parent/child relations are shown. Each Entity can have additional relations with other Entities, in particular precedent/dependent Relations. These precedent/dependent Relations are a direct result of the definitions used to define a given Entity. For example, the definition for the fulfillment Plastics.Demand (i.e. the Demand facet of the Plastics instance) in FIG. 5 may be based on some other Entity's value, such as Glass.Demand/2. (Glass could be another ProductMkt instance, like Plastic). This definition may return a Matrix that is based on the values of Glass.Demand. Plastics.Demand may then have a relationship with Glass.Demand, where Glass.Demand is the precedent and Plastics.Demand is the dependent. These relationships, like other relationships, are used to determine which Entities will be re-resolved when the precedent Entities change. Also note that the Expressions can include Entities from other Models, establishing Relationships across Models.

The right hand side of FIG. 5 shows an embodiment of a corresponding Entity created by each definition. In this embodiment, each definition creates one Entity. However, the same definition may be used to make multiple Entities. For example, if ProductMkt is instanced multiple times, and the default fulfillments are used, then the definitions of the default fulfillments may be used to create multiple Entities. In this case, the definition is essentially inherited through the definition of the Kind.

In the noted example, the Kind of the new Kind ProductMkt is "EntityKind". EntityKind is a Kind of Kind that, among other features, enables Facets to be included as members. The identification of the Kind of Kind as EntityKind specifies the capabilities of the given Kind. If the declaration had been New Kind("ProductMkt") instead, then it would not have allowed Facets to be included as members.

Note that there are numerous other Kinds of Kinds that could exist and each may offer its own unique features beyond those of Kind. Each Kind of Kind of is a Kind that derives from Kind and hence can have added members to provide additional features. ConstituentKind enables its members to specify the Kind of the parent when the corresponding Constituents are instantiated. EntityKind, which derives from ConstituentKind, also enables its members to specify Facets and Stages. In all these cases, as a new Kind instance is created, a user may specify both the Kind of Kind to be used and the base Kind. A Kind created by a derived Kind of Kind than that of its base Kind would still be part of the same Kind hierarchy as its base. This allows Derived Kinds to have additional features, both as defined on the Derived Kind and those defined on the Kind of the Derived Kind. The actual use of Kinds and all the additional features available through derived Kinds may be implemented through compiled code on the overlaid platform, to provide fast performance.

Note that each realized Entity has a corresponding realized definition object, except for an original definition that is created by the user and hence has no definition of its own. A definition object is a type of Expression that may or may not have code that can be accessed (for example, the definition for a compilation, which is the top object shown, has a definition without code).

Note also that each instance of a given Kind has a fulfillment Relation for each Facet of its Kind. If the definition for the Kind ProductMkt had an additional Facet defined, then instances of ProductMkt would have an additional fulfillment Relation that corresponds to that facet.

Note that a Relation has a definition that can be recreated, as the definition of a relation is not explicitly stored as a realized definition object.

This embodiment may be expanded to dramatically increase the complexity, with additional Kinds, Facets, layers, instances, etc. Through instancing Entities that have definitions inherited or duplicated, a Model can be written in a simple fashion.

Once the Model is opened in a DCP session and resolution is enabled, the system may begin resolution of the Model. Resolution is the process of bringing entities within the model to their final state, terminated or realized. Resolution may include resolving the definition of the Model (the left hand side) and evaluating the Model to get its value (the right hand side).

Resolving may be performed Entity by Entity, by executing the logic specified in the stages of the EntityKind of the given Entity. Each EntityKind inherits the stages specified by its base EntityKind, and can add additional stages as needed. In some embodiments, the overall set of Entities in the resolution process may look like those in FIG. 6, beginning with the left hand side and moving to the right.

Figure 6:
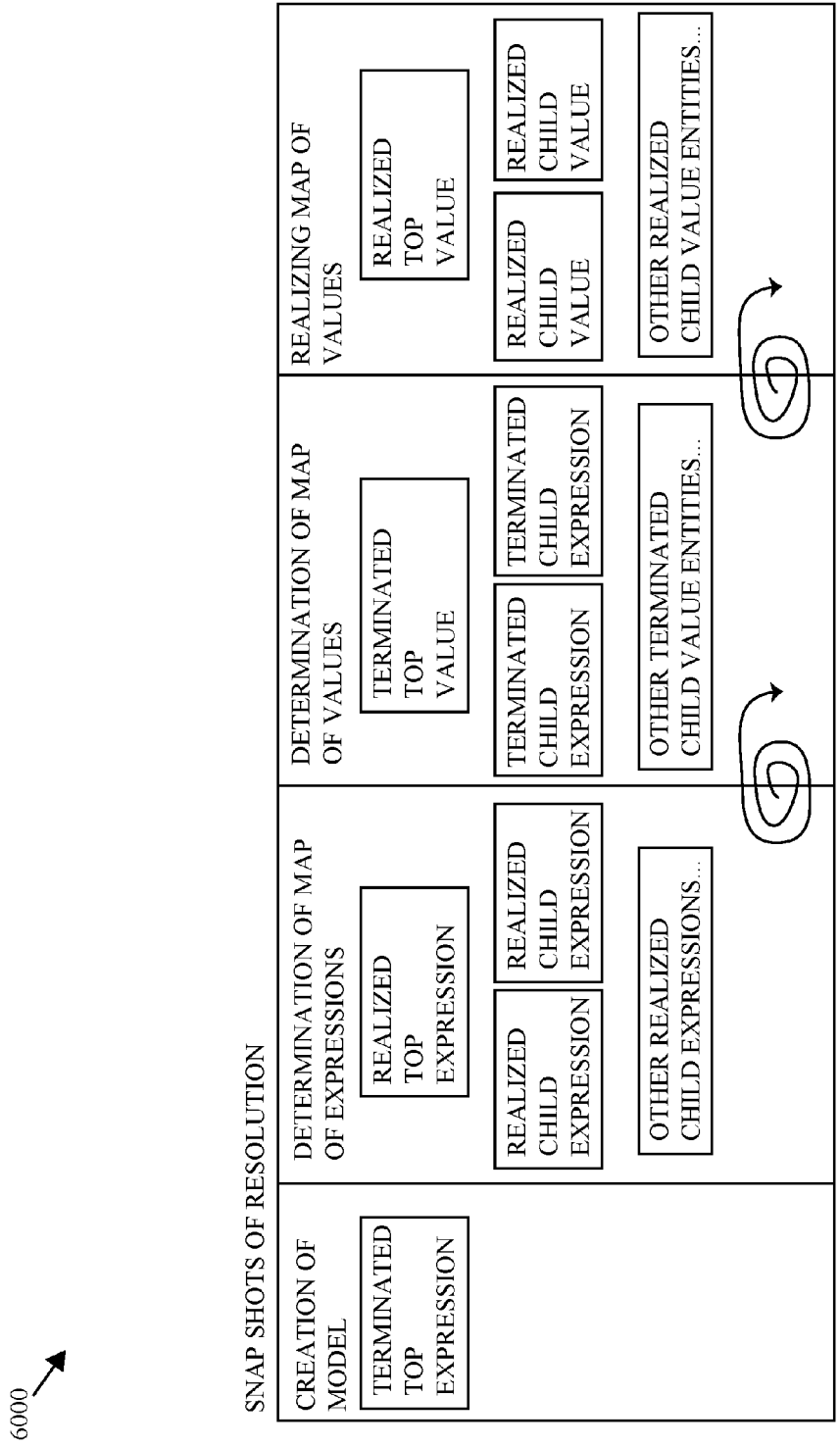
FIG. 6 depicts an embodiment of a snap shots of resolution for a definition-centered platform.

FIG. 6 illustrates an embodiment of snap shots of resolution of an expression 6000. The snap shots may include the creation of a Model, Determination of a Map of Expressions, Determination of a Map of values, and Realization of a Map of values. The DCP system may begin with Creation of the Model with a single unparsed Terminated Top Expression. As the DCP system realizes the single expression, the Terminated Top Expression may become a set of realized expressions in a tree hierarchy in the snap shot of the Determination of the Map of Expressions. For instance, the Terminated Top Expression may include or be associated with a Model that includes the tree hierarchy of multiple expressions such as a Realized Top Expression, one or more child Expressions, and other realized child Expressions.

As those expressions are realized, they can then be evaluated which would create a set of other Entities such as is shown in the snap shot of the Determination of the Map of values. These Entities would begin in their terminated state and then be individually evaluated until they are all realized, or an error is encountered.

As the Map of values are evaluated, the DCP system may determine the snap shot of the Realization of the Map of values like the one on the far right, where the Entity values form a hierarchy tree. Note that the progression of the snap shots of Resolution illustrates the results of the stages of resolution. However, the prior snap shots are not necessarily eliminated. In fact, all or some of these tree hierarchies may remain in the Model. For instance, the Model may still comprise the realized expression tree. Both of these tree hierarchies may be accessible by or report to the Model object parameters or expressions of fulfillment through fulfillment Relations and intervening Entities.

Note also that the spirals illustrated between the snap shots of the Map of Expressions, the Determination of the Map of values, and the snap shot of the Realization of the Map of values may represent loops where expressions are evaluated in an order to realize other parts of parent expressions. Note also that the scope of a resolution may be changed according to specific needs of a user for resolution of a Model.

Figure 8:
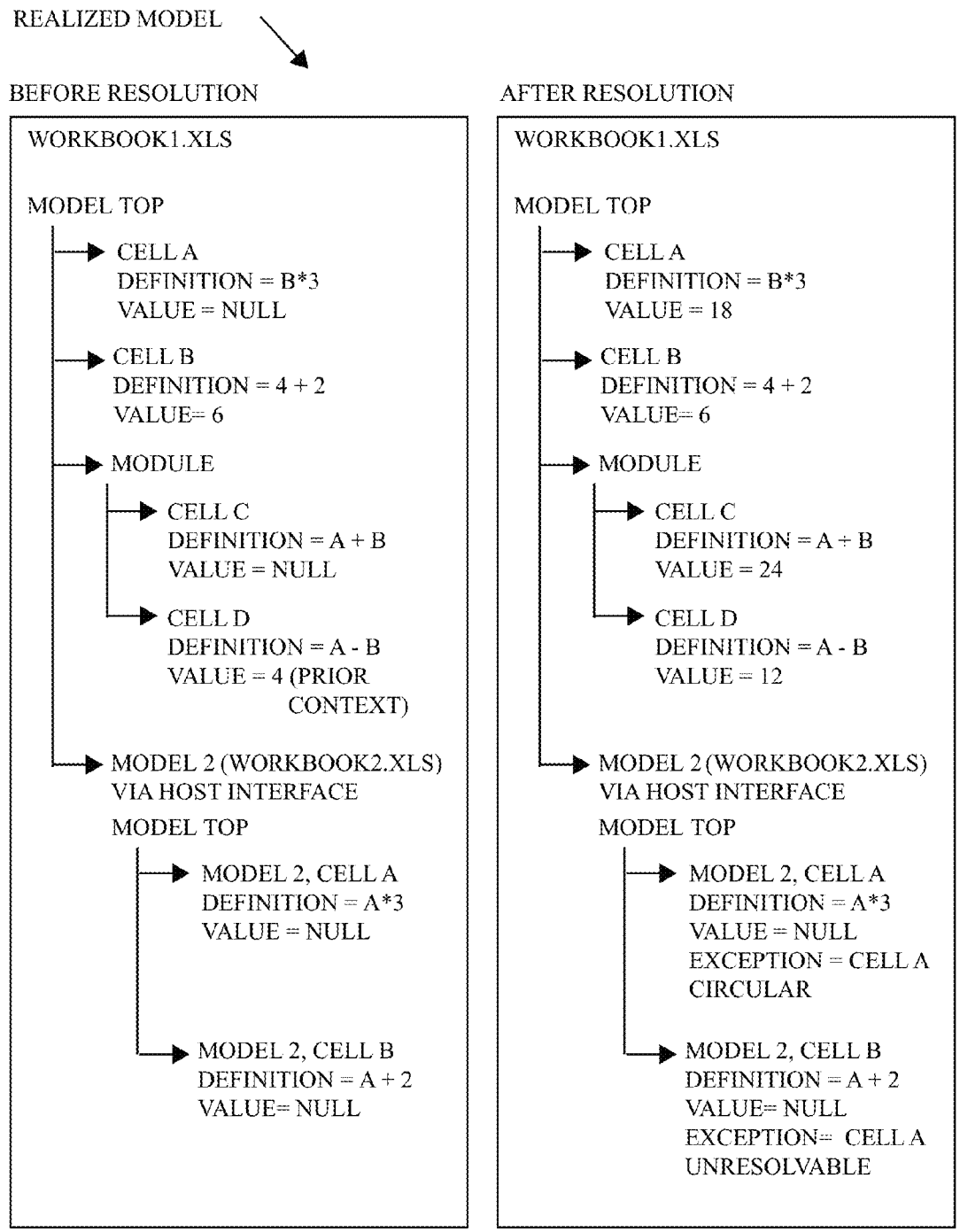
FIG. 8 depicts an embodiment of a realized Model before and after resolution.

FIG. 8 depicts an embodiment of a realized Model before and after resolution. The realized Model may comprise a WORKBOOK1.XLS. In other words, the Model is stored in the form of a worksheet named WORKBOOK1.XLS. In further embodiments, the realized Model may be stored in any format. The column demarked as the "Before resolution" shows the realized Model with values of "Null" where no value has previously been resolved (undetermined). In some embodiments, the properties demarked as "value" may have a prior value based on a prior resolution of the Model such as the value of Cell D wherein there is an indication that the value is based on resolution of the realized Model with the prior context.

The Model is an Entity that is created when a Model is created or opened. The Model's properties include TopExpression and TopValue, where TopValue is determined from evaluating the TopExpression in the Model's context. The TopExpression can be any content, such as the definition for a List or other Kind and each item in the list or the Kind may comprise a set of Expressions to be evaluated. In the present embodiment, the TopExpression comprises a Kind such as a Module having Cell A and Cell B. The Module has only static members, Cell A and Cell B, thereby allowing those members to be directly accessed by their names, i.e., Cell A and Cell B.

Note also that a Kind (like a Type) can contain static or instance members. If the Kind comprises instance members, then the Kind may be instanced in order to use the members. If the Kind comprises static members, then the members can be used directly. In other words, a report, for example, may access static members of the Kind by name rather than referencing content of an instance of the Kind by name.

The TopValue is a value determined for each Model. The TopValue may return a Kind, such as a Module, which contains the fulfillment of two named Facet members, A and B, each of which may be displayed in cells and is referred to, in the present embodiment, as Cell A and Cell B accordingly. In the Before Resolution version of the realized Model, the definition property of Cell A is an Expression of "B*3" and the value of Cell A is Null. The "B" in the Expression of the definition for the purposes of this example is a token having a logical address indicative of the value of Cell B.

The second Expression is in Cell B of the worksheet and has a Definition of "4+2" and a value of "6". In the case of Cell B, the Expression for the definition of Cell B does not include tokens or variables so the definition resolves to a number having a value of 6.

A first child Entity in the realized Model is a Module comprising Expressions in Cell C and Cell D. Since no Expression is associated with the Relation of the Model Top to the Module, the Module is effectively a child Entity of the Model Top. In other embodiments, the Module may be related to the Model Top by a Facet that includes an Expression selecting the greater value of the Cell C and the Cell D. In such embodiments, the Model Top may include a third Expression that is the value of the Module and the greater of the values between Cell C and Cell D may be brought up to the Model Top for use in the third Expression of the Model Top.

In the present embodiment, the Cell C may comprise a definition of "A+B" and a value of Null. The Expression of "A+B" includes two tokens, one referencing the value of Cell A and the other referencing the value of Cell B. The Cell D comprises a definition of "A-B" and a value based on the prior context of 4. In other embodiments, the references to Cell A and/or Cell B may include references to Cells in another worksheet or another workbook. In further embodiments, the references to Cell A and/or Cell B may include references to Cells in another type of data structure.

The realized Model also references a Model 2 (WORKBOOK2.XLS), indicating the values of the Model Top of the Model 2. Since the Model 2 is located in a second file, the realized Model may access the Model 2 via a host I/F such as the host I/F 2080 in FIG. 2. In the present embodiment, the Model 2, Model Top comprises two Expressions, in Cell A of Model 2 and in Cell B of Model 2. Cell A of Model 2 comprises a definition of "A*3" and a value of Null. In the present embodiment, the reference to A in the Cell of the Model 2 if a local reference and thus is resolved as the value of Model 2, Cell A. The Expression in Model 2, Cell B is "A+2" and the value of Model 2, Cell B before resolution is Null.

Referring now to the "After Resolution" version of the realized Model, we see the results of the resolution in the value properties. The value of Cell A is resolved to be 6 (the value of Cell B) times 3, which equals 18. The value of Cell B is still 6 because the Expression did not have tokens that are affected by the context. The value of Cell C of the Module is 18 (the value of Cell A) plus 6 (the value of Cell B), which equals 24. The value of Cell D of the Module is 18 (the value of Cell A) minus 6 (the value of Cell B), which equals 12.

The value of Model 2, Cell A of the WORKBOOK2.XLS is (the value of Cell A) times 3, which is a circular reference. In the present embodiment, the exception handling rules include the creation of a property called "Exception" associated with the Model 2, Cell A that is defined as "CELL A CIRCULAR" to indicate the circular reference in the definition of Model 2, Cell A.

The value of Model 2, Cell B of the WORKBOOK2.XLS is (the value of Cell A) plus 2, which is unresolvable because the value of Model 2, Cell A is unresolvable. In the present embodiment, the exception handling rules include the creation of a property called "Exception" associated with the Model 2, Cell B that is defined as "CELL A unresolvable" to indicate that the definition of Model 2, Cell B is unresolvable as a result of the token referencing the value of Model 2, Cell A.

Figure 9:
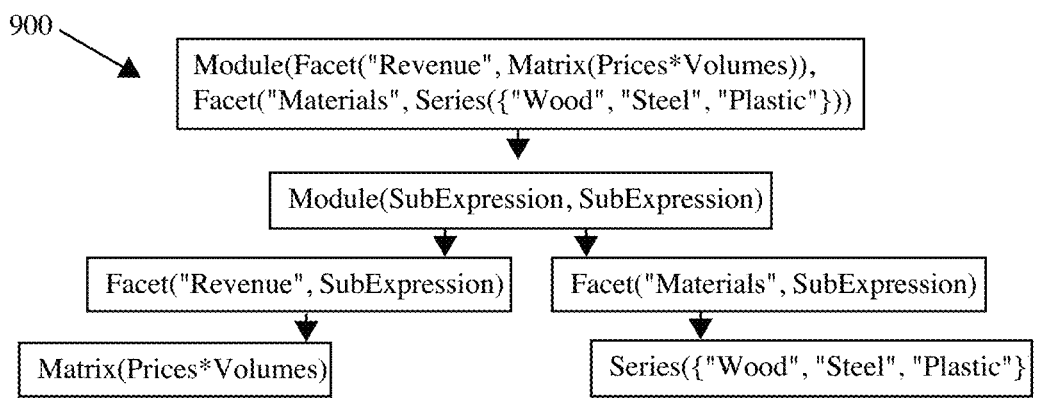
FIG. 9 depicts an embodiment of a hierarchy of an Expression with sub-Expressions that are related.

FIG. 9 illustrates an embodiment of an Expression 900 and the Model hierarchy created by the Expression. The Expression is Module(Facet("Revenue", Matrix(Prices*Volumes)), Facet("Materials", Series({"Wood", "Steel", "Plastic"}))). This Expression may be one of one or more Expressions in the definition of an Entity and the expression defines child Entities and fragment Relations. In particular, the Expression is a Module that defines two Facets, the first Facet indicating a resolve type of "Revenue" to be resolved by a Matrix having a token "Prices" and a token "Volumes" in an Expression of Prices*Volumes. The resolution of the Matrix (Prices*Volumes) may return a value of a Matrix with the Prices and Volumes of corresponding content multiplied to generate a Matrix of Revenue. The Facet sub-expression may be the value of the Matrix, which is the Matrix of Revenue.

The second Facet indicates a resolve type of "Materials" to be resolved by a Series having three values that are strings including "Wood", "Steel", and "Plastic". The value of the Series is fixed so the second sub-expression is the value "Wood", "Steel", and "Plastic". As a result, the value of the Module is a Matrix of the Revenues and the value "Wood", "Steel", and "Plastic". For example, the Matrix of the Revenues may include the Revenues for at least "Wood", "Steel", and "Plastic". In some embodiments, Constituents may retrieve the value of this Expression as a Matrix of Revenues and the value "Wood", "Steel", and "Plastic". In further embodiments, Constituents may retrieve a fragment of the value of this Expression as a portion of the Matrix of Revenues that is associated with "Plastic", a portion of the Matrix of Revenues that is associated with "Steel", and/or a portion of the Matrix of Revenues that is associated with "Wood".

Figure 10:
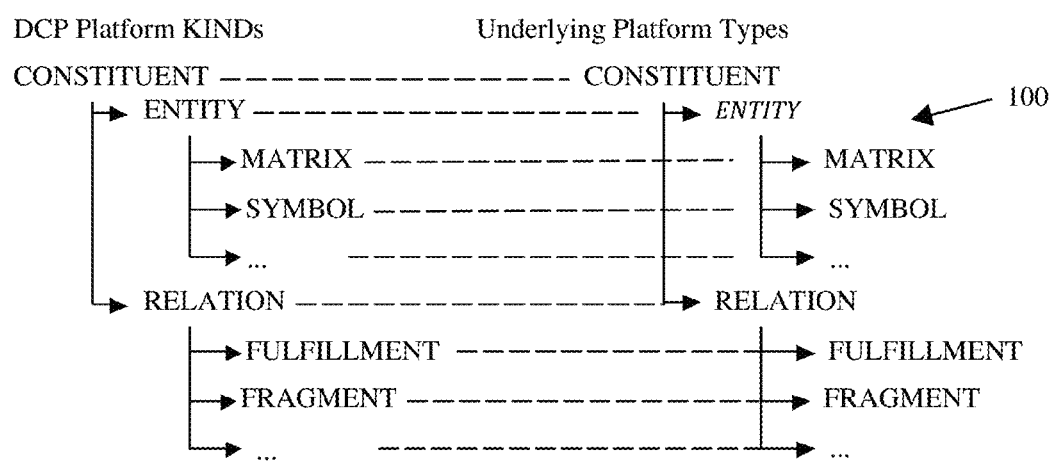
FIG. 10 depicts an embodiment of a Kind that maps an Entity and Relation of the definition-centered platform-to-platform types of an underlying platform such as Java Virtual Machine, .NET, and Mathematica.

FIG. 10 depicts an embodiment 100 of a Kind that maps an Entity and Relation of the definition-centered platform-to-platform types of an underlying platform such as Java Virtual Machine, .NET, and Mathematica. The "DCP Platform KINDS" represent the DCP Model hierarchy and the right side represents Constituents of the underlying platform types. In the present embodiment, while the identifiers for the underlying platform types are the same function names, these represent the code and/or function calls that are required to accomplish the desired functionality in the underlying platform type.

Each underlying platform type has an associated DCP platform type (aka Kind), which is a type of Entity. These type objects support features unique to the DCP system and may exist with parallel type objects of the underlying platform. DCP Types can include features of object-oriented platforms such as inheritance and encapsulation. Kinds exist for both Entity and Relation types. Kind types can be derived and can serve as the Kinds for other Kinds, enabling additional layers of abstraction. ConstituentKinds, which are types of Kinds, can specify Facets of their instances that are dynamic, and need to be fulfilled with an expression that returns a value of a specified type. Note that Facets are examples of dynamic content.

Figure 11:
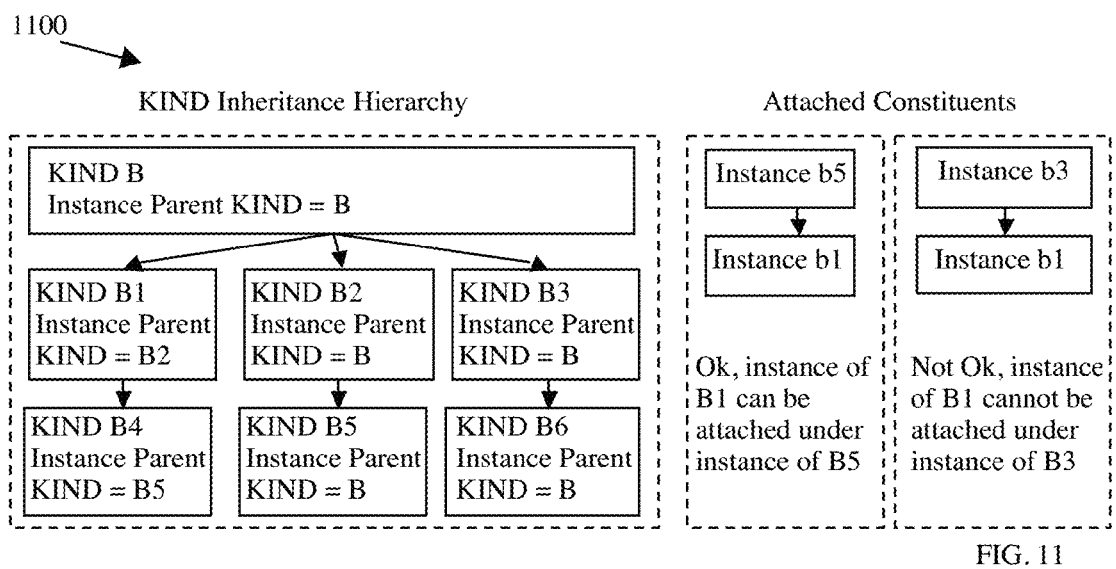
FIG. 11 depicts an embodiment of a Kind inheritance hierarchy.

FIG. 11 depicts an embodiment of a Kind inheritance hierarchy 1100. The Kind inheritance hierarchy is a process of defining rules for placing constraints on creation and use of instances of Entities, which is Kind in this example, but can be applied as rules to any Entities in a Model.

In the present embodiment, each ConstituentKind can specify allowable contexts to constrain how its instances are realized. Specifying allowable contexts can be accomplished by specifying the ConstituentKind that the parent of its instances must be assignable from, thereby limiting contexts within which instances of a Kind can be realized. In such embodiments, a Kind derived from another Kind must have a constraint on its instances that is within the constraints from its base or Parent Kind. The constraint placed on base Kinds can be used for early binding of expression tokens.

The Kind inheritance hierarchy 1100 in Kind B is a parent instance and thus is not constrained by inheritance from a parent instance. The Kind B1 is a child of parent instance Kind B2 and the Kind B4 is a child of parent instance B5. The Kind B2 is a child of parent instance Kind B and the Kind B5 is a child of parent instance B. And, the Kind B3 is a child of parent instance Kind B and the Kind B6 is a child of parent instance B.

Based on the Kind inheritance hierarchy 1100, the Kind B1 can be attached under an instance of the Kind B5 because the Kind inheritance hierarchy 1100 shows that the Kind B5 inherits the constraints of Kind B2. However, the Kind B1 can be attached under an instance of the Kind B3 because the Kind inheritance hierarchy 1100 shows that the Kind B3 inherits the constraints of Kind B and the Kind B1 must be constrained by the Kind B2. In further embodiments, other constraint hierarchies may be created as rules to include with a Model or in a Library and associated with a Model.

Figure 12:
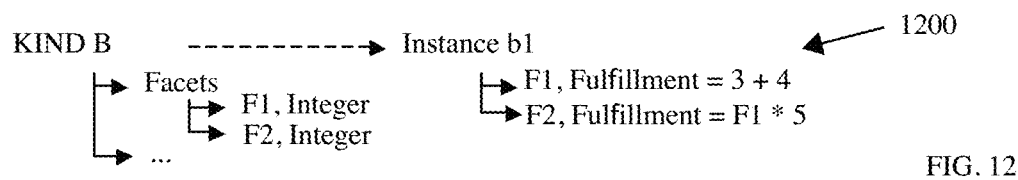
FIG. 12 depicts an embodiment of a realized Kind.

FIG. 12 depicts an embodiment 1200 of a realized Kind with Facets. A Fulfillment Relation may be a type of Relation whose instances are relations for a given argument of a Kind instance. Each Facet may specify a type and default fulfillment expression for instances of the Kind. A Facet may also include additional features. For example, a Facet may require that its fulfillment be constrained by specifying an expression that creates an Entity that is a child of the Kind's instance.

The illustration show a definition of a Kind B as having the Facets F1 and F2, wherein both F1 and F2 are constrained to be integers. The "instance b1" illustrates a realized instance of the Kind B that has a Facet F1 fulfillment defined as "3+4" and a Facet F2 fulfillment defined as "F1*5". The fulfillment is effectively equivalent of an Expression and the "F1" in the fulfillment of the Facet F2 is a token that refers to the value of a resolved Facet F1. Thus, the resolution of the Kind B instance b1 is the value for F1 being equal to 7 and the value of F2 being equal to 7 times 5, which equals 35.

Another embodiment is implemented as a program product for implementing systems and methods described with reference to FIGS. 1-12. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus comprising:
   memory to store definitions of Constituents comprising at least one Entity and at least one Relation, wherein the at least one Entity and the at least one Relation are associated with data structure types, wherein a Kind of the at least one Entity comprises an EntityKind, the EntityKind to define a property called Stages, wherein Stages defines a sequence of stages of progress for an instance of the EntityKind, wherein different EntityKinds can define Stages differently, wherein each stage of the sequence of stages contains a first code and a second code within its definition, the first code to be executed for the Entity to progress forward in stages of resolution to a next stage; and the second code to be executed for the Entity to progress backward in stages of resolution to a previous stage, wherein each Entity has a specific stage of the sequence of stages as part of its state to describe a state for an Entity instance that is being realized or terminated from a Model; and
   circuitry coupled with the memory comprising logic, wherein the logic comprises one or more processor to create instances of the at least one Entity in the Model, wherein each of the instances of the at least one Entity comprises definitions including the state, the state representing a progression through stages of resolution for the corresponding instance of the at least one Entity, wherein each of the instances of the at least one Entity comprises code for execution by the one or more processor to determine realized states of the instances of the at least one Entity by determining a current context of the Model and integrating the current context in each of the instances of the at least one Entity, and wherein each of the instances of the at least one Entity comprises code for execution by the one or more processor to resolve instances of the at least one Entity by resolving definitions of each of the instances of the at least one Entity in the Model.

2. The apparatus of claim 1, wherein each of the at least one Entity comprises an Expression as a definition.

3. The apparatus of claim 1, wherein the at least one Entity comprises a first Kind, a second Kind, and a third Kind, and the circuitry comprises logic to create an instance of third Kind that has a Kind of Kind relationship with second Kind, wherein the instance of third Kind is derived from first Kind.

4. The apparatus of claim 1, wherein a Kind of the at least one Entity comprises an EntityKind, the EntityKind to define a Facet, the Facet comprises a definition to require instances of the EntityKind to define an expression to be evaluated to determine a value consistent the definition of the facet.

5. The apparatus of claim 4, wherein the circuitry to resolve the definition for an instance of a precedent object is configured to re-evaluate the value of the Facet after a value in the instance of a precedent object changes.

6. The apparatus of claim 5, wherein the facet comprises a definition of default expression to be evaluated in case no other expression is specified.

7. A machine-accessible product comprising:
   a non-transitory medium containing instructions to output results, wherein the instructions, when executed by a processor, causes the processor to perform operations, the operations comprising:
   providing definitions of Constituents comprising at least one Entity and at least one Relation, wherein the at least one Entity and the at least one Relation are associated with data structure types, each Relation to be associated with an instance of an Object, wherein a Kind of the at least one Entity comprises an EntityKind, the EntityKind to define a property called Stages, wherein Stages defines a sequence of stages of progress for an instance of the EntityKind, wherein different EntityKinds can define Stages differently, wherein each stage of the sequence of stages contains a first code and a second code within its definition, the first code to be executed for the Entity to progress forward in stages of resolution to a next stage; and the second code to be executed for the Entity to progress backward in stages of resolution to a previous stage, wherein each Entity has a specific stage of the sequence of stages as part of its state to describe a state for an Entity instance that is being realized or terminated from a Model;
   creating instances of the at least one Entity in the Model, wherein each of the instances of the at least one Entity comprises definitions including the state, the state representing a progression through stages of resolution for the corresponding instance of the at least one Entity, wherein each of the instances of the at least one Entity comprises code for execution by the one or more processor to determine realized states of the instances of the at least one Entity by determining a current context of the Model and integrating the current context in each of the instances of the at least one Entity;
   resolving instances of the at least one Entity by resolving definitions of each of the instances of the at least one Entity in the Model; and
   outputting the results.

8. The machine accessible product of claim 7, wherein instances of the at least one Entity comprise an instance of EntityKind, wherein a member of the instance of EntityKind comprises a Facet, the Facet to store a definition to be evaluated to determine a value of the Facet, the circuitry to resolve the definition for an instance of a precedent object to re-evaluate the value of the Facet after a value in the instance of a precedent object changes.

9. The machine accessible product of claim 7, wherein the at least one Entity comprises a first Kind, a second Kind, and a third Kind, and the circuitry comprises logic to create an instance of third Kind that has a Kind of Kind relationship with second Kind, wherein the instance of third Kind is derived from first Kind.

10. A method comprising:

providing definitions of Constituents comprising at least one Entity and at least one Relation, wherein the at least one Entity and the at least one Relation are associated with data structure types, each Relation to be associated with an instance of an Object, wherein a Kind of the at least one Entity comprises an EntityKind, the EntityKind to define a property called Stages, wherein Stages defines a sequence of stages of progress for an instance of the EntityKind, wherein different EntityKinds can define Stages differently, wherein each stage of the sequence of stages contains a first code and a second code within its definition, the first code to be executed for the Entity to progress forward in stages of resolution to a next stage; and the second code to be executed for the Entity to progress backward in stages of resolution to a previous stage, wherein each Entity has a specific stage of the sequence of stages as part of its state to describe a state for an Entity instance that is being realized or terminated from a Model;

creating instances of the at least one Entity in the Model, wherein each of the instances of the at least one Entity comprises definitions including the state, the state representing a progression through stages of resolution for the corresponding instance of the at least one Entity, wherein each of the instances of the at least one Entity comprises code for execution by the one or more processor to determine realized states of the instances of the at least one Entity by determining a current context of the Model and integrating the current context in each of the instances of the at least one Entity;

resolving instances of the at least one Entity by resolving definitions of each of the instances of the at least one Entity in the Model; and outputting the results.

11. The method of claim 10, wherein instances of the at least one Entity comprise an instance of EntityKind, wherein a member of the instance of EntityKind comprises a Facet, the Facet to store a definition to be evaluated to determine a value of the Facet, the circuitry to resolve the definition for an instance of a precedent object to re-evaluate the value of the Facet after a value in the instance of a precedent object changes.

12. The method of claim 10, wherein the at least one Entity comprises a first Kind, a second Kind, and a third Kind, and the circuitry comprises logic to create an instance of third Kind that has a Kind of Kind relationship with second Kind, wherein the instance of third Kind is derived from first Kind.

* * * * *